US006236352B1

(12) United States Patent
Walmsley

(10) Patent No.: US 6,236,352 B1
(45) Date of Patent: May 22, 2001

(54) HETERODYNED DOUBLE SIDEBAND DIPLEX RADAR

(75) Inventor: Prescott A. Walmsley, San Diego, CA (US)

(73) Assignee: Eaton-Vorad Technologies, L.L.C., San Diego, CA (US)

( * ) Notice: Subject to any disclaimer, the term of this patent is extended or adjusted under 35 U.S.C. 154(b) by 0 days.

(21) Appl. No.: 09/428,694

(22) Filed: Oct. 28, 1999

(51) Int. Cl.$^7$ .................................................. G01S 13/26
(52) U.S. Cl. .................... 342/118; 342/127; 342/130; 342/134; 342/135; 342/21
(58) Field of Search ............................ 342/21, 118, 127, 342/128, 129, 130, 131, 132, 134, 135

(56) References Cited

U.S. PATENT DOCUMENTS

| | | | |
|---|---|---|---|
| 4,881,079 | * 11/1989 | Peregrim | 342/194 |
| 5,125,008 | * 6/1992 | Trawick et al. | 375/349 |
| 5,179,573 | * 1/1993 | Oaradise | 375/150 |
| 5,181,226 | * 1/1993 | Cantwell | 375/130 |
| 5,302,956 | 4/1994 | Asbury et al. | 342/70 |
| 5,325,096 | 6/1994 | Pakett | 342/70 |

OTHER PUBLICATIONS

Boyer, Wesley D., "A Diplex, Doppler Phase Comparison Radar", IEEE Transactions on Aerospace and Navigational Electronics, 1963.

Hewlett–Packards 35200 Doppler Radar Module Specifications, pp. 1–12.

* cited by examiner

Primary Examiner—John B. Sotomayor
(74) Attorney, Agent, or Firm—Jaquez & Associates; Martin J. Jaquez

(57) ABSTRACT

A heterodyned double side band diplex radar system determines the range of targets as a function of the amplitude variation of reflected target Doppler signals. The present invention includes a real radar system that accurately determines the range of fading targets and the magnitude of the velocity of the targets. The present invention also includes a complex radar system that determines the relative velocity of targets in addition to the range of targets. In either embodiment, the transmitted signal may be modulated with a pseudo-random number ("PN") sequence to attenuate or decorrelate signals reflected from targets beyond some maximum range. The modulation of the pseudo-random sequence may also attenuate or decorrelate signals reflected from targets closer than some minimum range. The present invention also includes a real radar system having BPSK modulation with PN coding. The selection of BPSK modulation enables or facilitates the implementation of a portion of the system in digital form. In particular, the generation of the IF signals needed to modulate and demodulate the transmitted and received signal may be implemented in a programmable logic device ("PLD").

56 Claims, 17 Drawing Sheets

HETERODYNED DOUBLE SIDEBAND DIPLEX RADAR

BACKGROUND OF THE INVENTION

1. Field of the Invention

This invention relates to radar systems (and sonar and ladar) and methods for determining the range of objects, and more particularly to radar systems and methods for accurately determining the range of objects having little or no relative velocity.

2. Description of Related Art

Radio Detection and Ranging ("Radar") is commonly employed to detect and determine the range of objects or targets relative to the radar system. FIG. 1 is a diagram of a general radar system 1 and a channel or medium 2 that includes a target 30. As shown in FIG. 1, the radar system includes a transmitter 10 having a transmit antenna 12 and a receiver 20 having a receive antenna 22. In simple terms, the transmitter 10 generates a signal s(t) that is converted to an electromagnetic wave 14 by the transmit antenna 12. The signal travels at the speed of light, c away from the transmit antenna 12 in the medium of the channel 2. The signal may reflect off targets or objects such as the target 30 in the channel 2. The receive antenna 22 receives the reflected electromagnetic waves and generates a signal $s_r(t)$, which is processed by the receiver 20. It is noted that the transmit antenna 12 and the receive antenna 22 may be in close proximity (monostatic radar systems). Alternatively, the transmitter 10 and the receiver 20 may be separated by a large distance (e.g., in bistatic radar systems).

In radar systems, if s(t) is a pulsed signal, the received signal $s_r(t)$ is nominally equal to $\alpha s(t-t_r)$. In such systems, $t_r$ is the round trip delay or the time required for the electromagnetic wave to travel from the radar transmit antenna to the target and back to the receive antenna and $\alpha x$ is an amplitude scaling coefficient. In such systems the range of the target is nominally equal to $cxt_r/2$ where c is the speed of light (approximately equal to $3(10^8)$m/s in a vacuum). If the target is moving away from or toward the radar system (ie., has a non-zero relative velocity), the relative velocity of the target may be determined by calculating the frequency or Doppler shift of s(t). In particular, it is well known that the velocity of the target, v, is nominally equal to $-f_d*c/f_0$ where $f_d$ is the Doppler frequency and $f_0$ is the frequency of the transmitted wave 14 of s(t). These principles also apply to sonar and ladar (laser-based) target detection and ranging systems. In radar the velocity of propagation is also the speed of light (the same as for radar). In sonar the velocity of propagation is the speed of sound (which varies with the nature of the medium in the channel).

Various radar systems and methods are developed to exploit these well-known attributes to measure the range or velocity of targets in different environments. For example, a prior art system 100 that is used to measure the range and velocity of objects is shown in FIG. 2. As is described below in more detail, the radar system 100 is a homodyned frequency shift keyed ("FSK") diplex radar system. As shown in FIG. 2, the system 100 includes a signal generator or oscillator 101, a transmit antenna 102, a transmit coupler 103, a receive antenna 106, a mixer 104, a switch 108, a dual anti-alias filter 105, and a signal processor 107. The signal generator 101 alternately generates two transmit signals: $s_1(t) = \text{Cos}((\omega_o + \omega_1)t - \theta 0)$ and $s_2(t) = \text{Cos}((\omega_o - \omega_1)t - \theta_0)$. The signal generator 101 is thus a diplexed signal generator that alternates between the generation of the $s_1(t)$ and $s_2(t)$ signals. The transmit signals $s_1(t)$ and $s_2(t)$ are transmitted by the transmit antenna 102 via the transmit coupler 103. The receive antenna 106 receives the reflected signals $s_r(t)$ from target objects where the signals are in the form of $s(t-\tau)$ (switching between $s_1(t-\tau)$ and $s_2(t-\tau)$). Accordingly, $s_r(t)$ is equal to either:

$$\text{Cos}((\omega_o + \omega_1)(t-\tau) - \theta_0) \text{ or } \text{Cos}((\omega_o - \omega_1)(t-\tau) - \theta_0).$$

The received signal $s_r(t)$ and the transmit signals $s_1(t)$ and $s_2(t)$ are down converted (mixed and low-pass-filtered) by the mixer 104 with the "local oscillator" ("LO") signal $\text{Cos}((\omega_o + \omega_1)t)$ and $\text{Cos}((\omega_o - \omega_1)t)$. The variable $\theta_0$ represents the phase delay of the signal between the transmit antenna 102 and the mixer 104 LO signal. The resultant signal is the low pass filter ("LPF") of $s_r(t) \times s_1(t)$ or $s_2(t)$, which is either:

$$\text{LPF} \{\text{Cos}((\omega_o+\omega_1)t)\text{Cos}((\omega_o\omega_1)(t-\tau)-\theta 0)\} = \text{Cos}((\omega_o+\omega_1)\tau+\theta_0) \qquad \text{Eq.1}$$

$$\text{LPF} \{\text{Cos}((\omega_o-\omega_1)t)\text{Cos}((\omega_o-\omega_1))(t-\tau)-\theta_0)\} = \text{Cos}(\omega_o-\omega_1)\tau+\theta_0). \qquad \text{Eq.2}$$

The switch 108 is synchronized to the changes in frequency at the diplexed transmit signal generator 101 and thus generates two different outputs at ports 110 and 112 having signals, F1 and F2 nominally equal to Eq. 1 and Eq. 2 after anti-alias filtering by the dual anti-alias filter 105.

In the above equations, "$\tau$" is the round trip propagation delay to the target. By substituting $\tau = (2/c)(R+Vt)$ and by letting $\omega_d = \omega_o(2V/c)$ (note that the Doppler frequency is $f_d = 2Vf_0/c$), $\theta_0' = \omega_o(2R/c) + \theta_0$, $\omega_1' = \omega^1(1-(2V/c)) \approx \omega_1$, then $\omega_o\omega_o\tau + \theta_0 = \omega_o(2V/c)t + \omega_o(2R/c) + \theta_0 = \omega_d t + \theta_0'$, and $\omega_1\tau + \theta_1 = \omega_1(2V/c)t + \omega_1(2R/c) + \theta_1 = \omega_1(2V/c)t + \theta_1 + 2\omega_1 R/c = \theta_1 + 2\omega_1 R/c$. Therefore the equations that were written in terms of $\tau$ can also be written as:

$$F2 \text{Cos}((\omega_d t + \theta_0' + 2\omega_1 R/c)) \text{ and}$$

$$F1 = \text{Cos}(\omega_d t + \theta_0' - 2\omega_1 R/c)).$$

Thus, the F1 and F2 signals of the radar system 100 have the same amplitude and frequency but have a different phase. The phase difference between the F1 and F2 signals is $\Delta\phi = 2\omega_1\tau = 2(2\omega_1 R/c) = (4\pi(2f_1)R/c)$. Accordingly for this system 100, the range R is computed by the signal processor 107 as follows: $R = (\Delta\phi)c/(4\pi(\Delta f))$ where $\Delta f = 2f_1$ is commonly called the "deviation frequency". Targets of the prior art system (real FSK diplex Doppler radar) appear as signals of the form $\text{Cos}(\omega_d t + \theta_0' - 2\omega_1 R/c)) = \text{Cos}(\omega_o(2V/c)t + \theta_0' - 2\omega_1 R/c))$.

For outbound targets, i.e., targets with increasing range with time, the Doppler shift $f_d$ is negative. For inbound targets, i.e., targets with decreasing range with time, the Doppler shift $f_d$ is positive. The FFT spectrum for real receivers, however, is always symmetrical about its origin. Specifically, the negative frequency portion of the spectrum is equal to the complex conjugate of the positive frequency portion of the spectrum. It is because of this symmetry that target Doppler signals appearing in any Doppler bin may either be inbound targets or outbound targets, thus there exists a velocity direction ambiguity.

Since the two halves of the spectrum in real receivers contain essentially the same information it is customary in real receivers to only process target information in only one half of the spectrum, e.g., in the positive frequency portion of the spectrum. In the prior art system 101 the direction ambiguity is resolved by observing the polarity of the measured delta phase. Since it is known that target ranges must always be positive it can be inferred whether the target information corresponds to an inbound or outbound target. It must be pointed out that resolving this ambiguity does not resolve inbound and outbound targets in the sense of having independent measurements. It is a weakness of the prior art system that the information for two targets with the same Doppler frequency, e.g., one inbound at $+f_d$ and one outbound at $-f_d$, will have their information appearing in the same FFT Doppler bin, resulting in a single corrupted measurement. The resulting measurement cannot be independent for each target since there is only one measurement. If it were possible for the Doppler information for each target to appear in separate FFT Doppler bins then the two targets would actually be resolved in the sense of having independent measurements for each target.

As described above, in homodyned FSK radars, the transmit signal is alternated between a first frequency $f_0+f_1$ and a second frequency $f_1-f_1$ signal by the signal generator 101. The signal generator 101 is commonly implemented using a Gunn oscillator. In operation, an external voltage biases the Gunn oscillator or a varactor diode is used to tune the Gunn's frequency. The voltage is varied between two values to generate the $s_1(t)$ and $s_2(t)$ transmit signals. Any changes to the deviation frequency creates errors in the range calculations for the system 100. Changes to the deviation frequency may occur due to temperature variations or aging of the oscillator 101.

Radars may be utilized in many different applications. In some applications, it may be desirable to be able to determine the range of a target that has zero relative velocity. Such a system may be desirable when used in conjunction with a cruise control system in a vehicle or a side facing radar to detect vehicles in adjacent lanes. Given the equations provided above, it is apparent that the prior radar system 100 is unable to determine the range of a target having zero relative velocity since the phase of the DC Doppler return voltage cannot be measured. In some applications for the radar system 100 this limitation may be undesirable or unacceptable. Another common problem with the performance from the prior art is that the diode mixers that are commonly employed as mixers in radar systems (such as the mixer 104) generate excessive low frequency noise. The range information present in the F1 and F2 signals of the prior art system 100 also occurs at low frequencies for these applications. Consequently these signals may become corrupted or distorted.

In addition to being unable to determine the range of a target having zero relative velocity, the prior art system 100 also has difficulty determining the range of "fading targets". A target appears as a fading target to a radar system when the radar signal reflected by the target has multiple reflections off the target such as from different points along the surface of a target. The numerous reflections of the signal that are reflected by the target generate constructive and destructive interference. In particular, the reception of multiple signals reflected from a single target can distort the phase of the received signal. In the prior art system 100 shown in FIG. 2, such a distortion of the phase also distorts or limits the accuracy of range determinations.

Finally, the prior art system 100 of FIG. 2 may not be able to resolve range ambiguities. Target range is calculated by a phase measurement. All phase measurements are ambiguous in multiples of 360°. Therefore, it is possible for the prior art system 100 to detect a target and calculate its range with a large range ambiguity. Consequently, a need exists for a radar system that can accurately determine the range of targets with little ambiguity.

SUMMARY OF THE INVENTION

The present invention includes a diplex Doppler radar system that calculates target range using target Doppler amplitude information instead of target Doppler phase information. The system generates and transmits a double side band ("DSB") modulated signal that is modulated on a radio frequency ("RF") signal. The system is a heterodyned system that has a low noise floor relative to typically high mixer noise levels at low target Doppler frequencies.

The present invention includes a radar system for determining the range of targets. The system preferably includes an RF signal generator, an IF frequency generator, an IF modulator, an RF downconverter, an in-phase IF demodulator, and an out-of-phase IF demodulator. The RF signal generator generates an RF signal. The IF frequency generator generates an IF modulation signal, an in-phase IF modulation signal, and an out-of-phase IF modulation signal. The IF modulator is coupled to the RF signal generator and IF frequency generator and mixes the RF signal and the IF modulation signal to generate a transmit signal. The RF downconverter is coupled to the RF signal generator and mixes a received signal and the RF signal to generate an intermediate IF signal.

The in-phase IF demodulator is coupled to the RF downconverter and the IF frequency generator and mixes the intermediate IF signal and the in-phase IF modulation signal to generate an in-phase baseband signal. The out-of-phase IF demodulator is coupled to the RF downconverter and the IF frequency generator and mixes the intermediate IF signal and the out-of-phase IF modulation signal to generate an out-of-phase baseband signal. The system may also include an RF coupler, a dual anti-alias filter, and a signal processor. The dual anti-alias filter suppresses undesirable non-baseband signal residuals from the demodulation process. The ratio of the amplitudes of the in-phase baseband signal and the out-of-phase baseband signal calculated in the signal processor includes information about the range of targets.

The radar system may also include a transmit antenna. The transmit antenna is coupled to the IF modulator and converts the transmit signal to an electromagnetic wave. In addition, the radar system may include a receive antenna. The receive antenna is coupled to the RF downconverter. The RF downconverter receives electromagnetic waves and converts them to a receive signal. In a preferred embodiment, the IF frequency generator uses BPSK signals in the form of a pseudo random sequence for the IF modulation signal, the in-phase IF modulation signal and the out-of-phase modulation signal. In this embodiment, the three signals are related to each other by time delays. The in-phase IF modulation signal and the out-of-phase IF modulation signal always have a non-zero time delay relationship between them whereas the IF modulation signal usually has a nearly zero delay relationship with the in-phase IF modulation signal.

Another possible embodiment would only restrict the in-phase and out-of-phase signals to be real valued signals with a non-constant cross-correlation amplitude function, preferably strongly correlated with the transmit modulation signal.

In another embodiment, the IF frequency generator may include an oscillator and a plurality of counters. The oscillator generates a predetermined clock rate. The plurality of counters is coupled to the oscillator and generates at least two different signals. In this embodiment the clock rate of one of the at least two different signals corresponds to the IF modulation signal. The phase delay between two of the at least two different signals corresponds the phase delay between the in-phase IF modulation signal and the out-of-phase IF modulation signal. The IF modulation signal may have a clock rate of 1.25 MHz. The in-phase IF modulation signal and the out-of-phase IF modulation signal may have a clock rate of 83.33 KHz. One other signal may have a clock rate of 1.333 MHz for downconverting 1.25 MHz received signals to 83.33 KHz. In this embodiment the output of the first IF demodulator may nominally have a frequency of 83.33 KHz which is commonly called the "second IF" frequency. The signals at second IF frequency may be coupled to a second downconverter mixer. This receiver architecture is called a "dual downconversion receiver" when the signals output by the second downconversion mixer are at baseband. One skilled in the art may extend the idea of a dual downconversion receiver to a triple downconversion or a quadruple downconversion receiver, and so on.

Any downconversion mixer could be implemented as an analog to digital ("A/D") converter or sample and bold circuit. By making the A/D converter or sample and hold circuit sample the input signal at a rate equal to any harmonic of the IF frequency, the output samples will have essentially the same values as if the input signals were at baseband. This technique is called an "aliased downconversion receiver". Such receiver implementations are also covered by the scope of this invention.

The preferred embodiment of this invention includes the use of BPSK IF signals for modulation and/or demodulation. BPSK signals differ from sinusoidal signals in that they are comprised of principally two discrete states, such as from digital logic. The mathematical formulas presented in this document only describe the signals for the case of the use of sinusoidal IF signals, however this not a limitation of the scope of this invention. The use of squarewave BPSK IF signals results in very analogous behavior as when sinusoidal IF signals are used. A 90° phase delay of a squarewave BPSK IF signal, for example, can be produced by a time delay of ¼ period of the squarewave waveform. The use of PN-coded BPSK IF signals can result in the same behavior as for squarewave BPSK IF signals under some useful conditions, such as in the preferred embodiment with the PN-coded BPSK IF. In particular, the 90° phase delay of the PN-coded BPSK IF signal can be implemented by a time delay equal to one chip-time of the PN code waveform.

In one preferred embodiment, the pseudo random sequence is 32 bits in length. A preferred 32-bit pseudo random sequence is "0000 0011 0111 1001 1110 1010 1001 0011". In another preferred embodiment, the pseudo random sequence is 24 bits in length. A preferred 24-bit pseudo random sequence is "0000 0110 0010 1011 1101 1011". In another preferred embodiment, the pseudo random sequence is 16 bits in length. A preferred 16-bit pseudo random sequence is "0000 1001 0111 0111". In another preferred embodiment, the pseudo random sequence is 12 bits in length.

A preferred 12-bit pseudo random sequence is "0000 1011 1011". In another preferred embodiment, the pseudo random sequence is 8 bits in length. A preferred 8-bit pseudo random sequence is "0001 0111". In another preferred embodiment, the pseudo random sequence is 20 bits in length. A preferred 20-bit pseudo random sequence is "0000 0100 1110 1101 0111". In another preferred embodiment, the pseudo random sequence is 28 bits in length. A preferred 28-bit pseudo random sequence is "0001 0101 1011 1010 1111 0010 0011".

In another embodiment of the invention, the radar system includes an RF signal generator, an IF frequency generator, an IF modulator, a first RF downconverter, a first in-phase IF demodulator, a first out-of-phase IF demodulator, a phase shifter, a second in-phase IF demodulator, and a second out-of-phase IF demodulator. The first RF downconverter is coupled to the RF signal generator and mixes a received signal and the RF signal to generate a first intermediate IF signal. The first in-phase IF demodulator is coupled to ti first RF downconverter and the IF frequency generator and mixes the first intermediate IF signal and the in-phase IF modulation signal to generate a real in-phase baseband signal. The first out-of-phase IF demodulator is coupled to the first RF downconverter and the IF frequency generator and mixes the first intermediate IF signal and the out-of-phase IF modulation signal to generate an real out-of-phase baseband signal. The phase shifter is coupled to the RF signal generator and shifts the phase of the RF signal by 90degrees.

The second RF downconverter is coupled to the phase shifter and mixes the received signal and the phase-shifted RF signal to generate a second intermediate IF signal. The second in-phase IF demodulator is coupled to the second RF downconverter and the IF frequency generator and mixes the second intermediate IF signal and the in-phase IF modulation signal to generate an imaginary in-phase baseband signal ("imaginary" in the mathematical sense of complex numbers). The second out-of-phase IF demodulator is coupled to the second RF downconverter and the IF frequency generator and mixes the second intermediate IF signal and the out-of-phase IF modulation signal to generate an imaginary out-of-phase baseband signal. Whenever an embodiment includes both a real and an imaginary component of a baseband time-domain target signal, such as with the in-phase baseband and out-of-phase baseband signals, it is usually called a "complex receiver". The ratio of the amplitudes of the real in-phase baseband signal and the real out-of-phase baseband signal includes information about the range of targets.

The present invention also includes a radar system having an RF signal generator, an IF frequency generator, a BPSK modulator, an RF downconverter and a BPSK demodulator. The RF signal generator generates an RF signal. The IF frequency generator generates a BPSK modulation signal, an in-phase BPSK demodulation signal, and an out-of-phase BPSK demodulation signal. The BPSK modulator is coupled to the RF signal generator and the IF frequency generator and modulates the RF signal with the BPSK modulation signal to generate a transmit signal. The RF downconverter is coupled to the RF signal generator and mixes the received signal and the RF signal to generate an intermediate IF signal.

The BPSK demodulator is coupled to the RF downconverter and the BPSK demodulator and demodulates the intermediate IF signal to generate an in-phase baseband signal and an out-of-phase baseband signal. The ratio of the amplitudes of the in-phase baseband signal and the out-of-phase baseband signal includes information about the range of targets.

The radar system may also include a transmit antenna. The transmit antenna converts the transmit signal into an electromagnetic wave. The radar system may also include a receive antenna. The receive antenna converts the received electromagnetic wave into an electrical signal. The radar system may also include a circulator. The circular allows the radar to use a single antenna for both transmitting signals and receiving signals by passing the transmit signal to the antenna and also passing the receive signal to the RF downconverter. It is also understood that in a ladar system using this invention, the antenna corresponds to an optical lens, mirror, laser, diode, or other apparatus for interfacing the transmit and/or receive signals into the medium of the channel. It is also understood that in a sonar system using this invention, the antenna correspond to an acoustical transducer, such as an electromagnetic, electrostatic or piezoelectric speaker or microphone, for interfacing the transmit and/or receive signals into the medium of the channel.

The radar system may also include a low-pass filter ("LPF"). The LPF is coupled to the demodulator output and lowpass filters the in-phase baseband signal and the out-of-phase baseband signal to remove non-baseband frequencies. The radar system may also include a sampling circuit and a signal processor. The sampling circuit may be an A/D converter or a sample and hold circuit. The sampling circuit samples the in-phase baseband signal and the out-of-phase baseband signal for use by the signal processor. The signal processor may transform the in-phase baseband signal and out-of-phase baseband signal from the time domain to the frequency domain by a Fourier transform operation before the calculation of target range from the in-phase baseband signal and the out-of-phase baseband signal.

In this embodiment, the IF frequency generator may include an oscillator and digital logic. The oscillator generates a predetermined clock rate signal. The digital logic is coupled to the oscillator and generates at least two different signals. At least one of the two signals is used as the BPSK modulation signal. At least one of the two signals is used as the in-phase BPSK demodulation signal and a separate signal is used as the out-of-phase BPSK demodulation signal. In this embodiment the three signals are related to each other by time delays. The BPSK modulation signal often has a zero delay relationship with the in-phase BPSK demodulation signal. The out-of-phase BPSK demodulation signal always has a non-zero delay relationship with the in-phase BPSK demodulation signal.

BRIEF DESCRIPTION OF THE DRAWINGS

The objects, advantages, and features of this invention will become readily apparent in view of the following description, when read in conjunction with the accompanying Figures, in which.

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Figure 1:
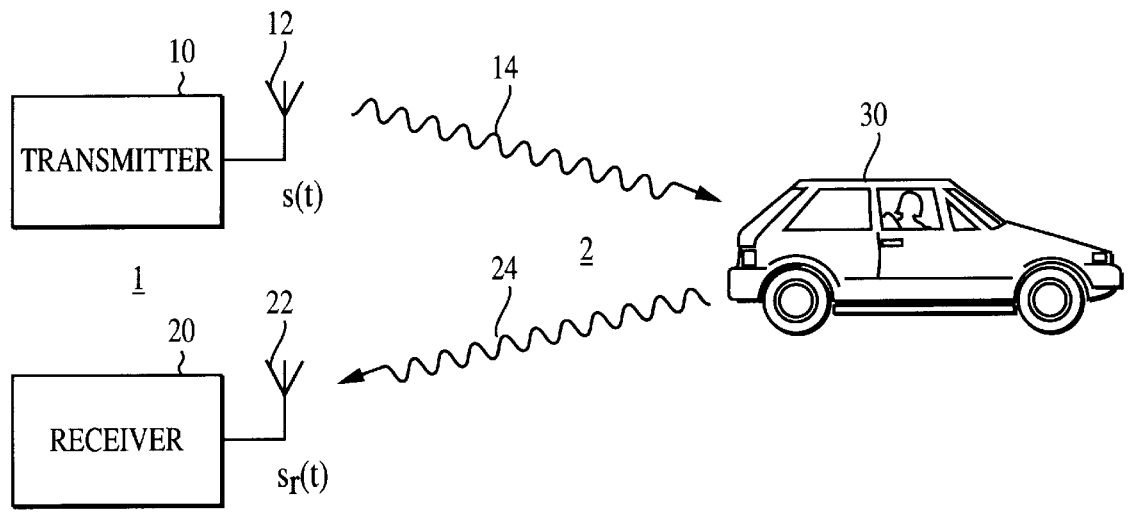
FIG. 1 is a diagram of an application of a basic radar system in a channel.
Figure 2:
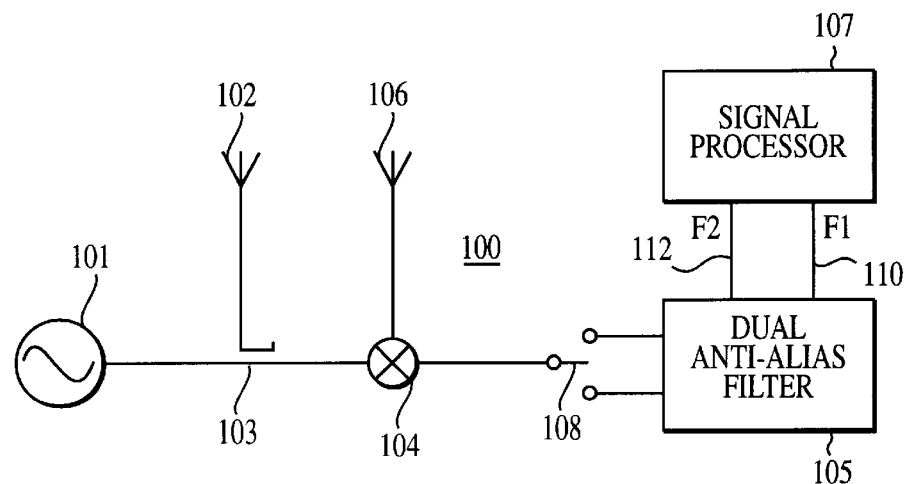
FIG. 2 is a block diagram of a prior art homodyned frequency shift keyed diplexed radar system.
Figure 3:
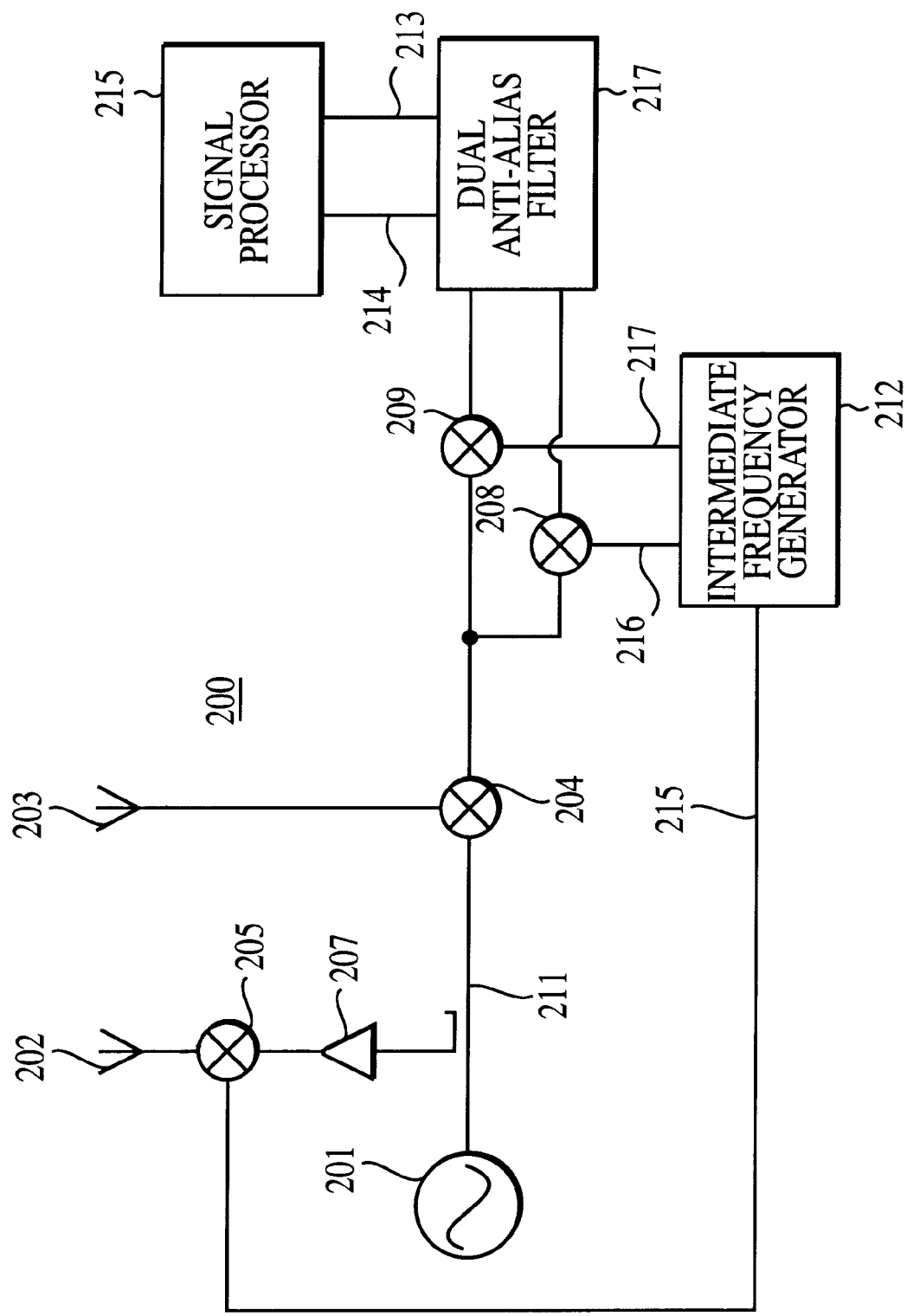
FIG. 3 is a block diagram of a real heterodyned DSB diplexed radar system in accordance with the present invention.

FIG. 3 is a block diagram of an exemplary radar system 200 according to the present invention. The system 200 is a real heterodyned DSB diplex radar system. As shown in FIG. 3, the system 200 preferably includes an RF signal generator 201, a transmit antenna 202, a receive antenna 203, an RF downconverter 204, an intermediate frequency ("IF") modulator 205, an in-line amplifier 207, an in-phase IF downconverter 208, a quadrature IF downconverter 209, an RF coupler 211, an intermediate frequency generator 212, a dual antialias filter 217, and a signal processor 215. In the embodiment shown in FIG. 3, the RF generator 201 nominally generates an RF signal, s(t) having the form of $Cos(\omega_o t - \theta_0)$; where $\theta_0$ is the phase delay of the signal between the RF generator 201 and the RF downconverter 204. Ideally $\theta_0$ is set to a value so that the phase of the RF signal is zero at the LO port of the RF downconverter 204. In one embodiment of the present invention, the signal generator 201 operates at a frequency of 24.125 GHz. The RF signal is amplified by the in-line amplifier 207 prior to the IF modulation stage.

The intermediate frequency ("IF") generator 212 produces three signals 215, 216, and 217, including an IF modulation signal, $I_{mod}$ 215, an In-phase IF signal, $I_{if}$ 216, and a Quadrature IF signal, $Q_{if}$ 217. Nominally, the $I^{mod}$, $I_{if}$ and $Q_{if}$ signals are equal to $Cos(\omega_1 t-\theta_1)$, $Cos(\omega_2 t)$, and $Sin(\omega_2 t)$, respectively where $\theta_1$ is the phase delay of the signal between the IF generator 212 and the IF modulator 205. $\theta_1$ is an offset phase to correct for any phase delay between the generation of the signal by the IF generator 212 and the IF modulator 205. For the $I_{if}$ and $Q_{if}$ signals, $\omega_2$ is an offset frequency when it is not equal to $\omega_1$. In some embodiments of the present invention, described below, $\omega_2$ may equal $\omega_1$ (no offset). The IF modulator 205 modulates s(t) with $I_{mod}$ to generate the transmit signal $X_{mt}(t)$ at the antenna 202. The antenna 202 converts the transmit signal $X_{mt}(t)$ to an electromagnetic wave. Given the nominal values of s(t) and $I_{mod}$, it can be shown that the transmit signal $X_{mt}(t)$ is equal to:

$$Cos(\omega_o t-\theta^0)Cos(\omega_1 t-\omega_1)=Cos((\omega_o-\omega_1)\,t-((\omega_o-\theta_1))+Cos((\omega_o+\omega_1)t-(\theta_0+\theta 1))$$

In other embodiments of the invention the transmit signal Xmt(t) could be a beam of light as in a ladar, or an acoustic wave as in sonar.

The receive antenna 203 receives any reflected electromagnetic energy from targets and generates a receive signal $R_{cv}(t)$ where the signal is nominally equal to $X_{mt}(t-\tau)$. Accordingly, $R_{cv}(t)$ is equal to:

$=Cos(\omega_o t-\tau)-\theta_0)Cos(\omega_1(t-\tau)-\theta_1);$ $=Cos((\omega_o-\omega_1)(t-\tau)-(\theta_0-\theta_1))+Cos((\omega_o+\omega_1)(t-\tau)-(\theta_0+\theta_1));$ and $=Cos(-(\omega_o-\omega_1)t+(\omega_o-\omega_1)\tau+(\theta_0-\theta_1))+Cos(-(\omega_o+\omega_1)t+(\omega_o+\omega_1)\tau+(\theta_0+\theta_1)).$ The RF downconverter 204 mixes the RF signal s(t) with the receive signal $R_{cv}(t)$ and low pass filters the result to generate an intermediate IF signal $DI_{if}$ which is nominally equal to:

$=Cos(\omega_o\tau+\theta_0)Cos(\omega_1(t-\tau)-\theta_1);$ and $=Cos(\omega_o t+(\omega_o-\omega_1)\tau+(\theta_0-\theta_1))+Cos(-\omega_1 t+(\omega_o+\omega_1)\tau+(\theta_0+\theta_1)).$ The In-phase IF downconverter 208 mixes the $DI_{if}$ signal with the In-phase IF signal $I_{if}$ and the dual anti-alias filter 217 anti-alias filters the result to generate a baseband In-phase DII signal 214 which is nominally equal to:

$=Cos(\omega_o\tau+\theta_0)Cos(\omega_2-\omega_1)t+\omega_1\tau+\theta_1);$ and $=Cos(-(\omega_2-\omega_1)t+(\omega_o-\omega_1)\tau+(\theta_0-\theta_1))+Cos(\omega_2-\omega_1)t+(\omega_o+\omega_1)\tau+(\theta_0+\theta_1)).$ The Quadrature IF downconverter 209 mixes the $DI_{if}$ signal with the Quadrature IF signal $Q_{if}$ and the dual anti-alias filter 217 anti-alias filters the result to generate a baseband Quadrature DIQ signal 213 which is nominally equal to:

$=Cos(\omega_o\tau+\theta_0)Sin(\omega_2-\omega_1)t+\omega_1\tau+\theta_1);$ and $=-Sin(-(\omega_2-\omega_1)t+(\omega_o-\omega_1)\tau+(\theta_0-\theta_1)+Sin((\omega_2-\omega_1)t+(\omega_o+\omega_1)\tau+(\theta_0+\theta_1)).$ As described above in the background of the invention section, "$\tau$" is the round trip propagation delay to the target. By substituting $\tau=(2/c)(R+Vt)$ and by letting $\omega_d=\omega_o(2V/c)$ (note that the Doppler frequency is $f_d=2Vf_0/c$), $\theta_0'=\omega_o(2R/c)+\theta_0$, $\omega_1'=\omega_1(1-(2V/c))\approx\omega_1$, and $\omega_{offset}=\omega_2-\omega_1'$. Then $\omega_o\tau+\theta_0=\omega_o(2V/c)t+\omega_o(2R/c)+\theta_0=\omega_d t+\theta_0'$ and $(\omega_2-\omega_1)t+\omega_1\tau+\theta_1=(\omega_2-\omega_1)t+\omega_1(2V/c)t+\omega_1(2R/c)+\theta_1=(\omega_2-\omega_1+\omega_1(2V/c))t+\theta_1+2\omega_1 R/c=(\omega_2-\omega_1')t+\theta_1+2\omega_1 R/c=\omega_{offset}t+\theta_1+2\omega_1 R/c$. Therefore the equations that nominally represent DII and DIQ can also be written as follows:

$DII=Cos(\omega_d t+\theta_0')Cos(\omega_{offset}t+\theta_1+2\omega_1 R/c);$ and $DIQ=Cos(\omega_d t+\theta_0')Sin(\omega_{offset}t+\theta_1+2\omega_1 R/c).$ In one embodiment of the present invention, the offset is set to zero ($\omega_2=\omega_1$) and $\theta_1$ is also set to zero. Accordingly, the equations simplify to the following:

$DII=Cos(\omega_d t+\theta_0')Cos(2\omega_1 R/c);$ and $DIQ=Cos(\omega_d t+\theta_0')Sin(2\omega_1 R/c).$ In a preferred embodiment of the invention, the DII and DIQ signals are FFT processed separately by the signal processor 215. Although these signals have the same frequency and phase, they have different amplitudes depending on target range. The amplitude relationship between the two channels is $DIQ/DII=Sin(2\omega_1 R/c)/Cos(2\omega_1 R/c)=Tan(2\omega_1 R/c)$. Given this relationship, the diplex radar range equation for this architecture is $\Delta\phi=Arctan(DIQ/DII)$. Accordingly, the measured phase angle is converted to a measurement of target range by the signal processor according to the relationship $R=(\Delta\phi)c/(4\pi f_1)$.

By reviewing the equations derived above, one skilled in the art will appreciate that the range of a target is determined as a function of the amplitude of the signals rather than as a function of the phase of the signals as in prior art systems. This technique prevents against range determination distortion due to target fading. Note that the present invention uses a heterodyned receiver. This raises the signal to noise ratio by processing target signals at IF frequencies that have a lower noise floor than in the low frequency $1/f$ noise region where diode mixers commonly employed as downconverters typically have very poor noise performance. As can be appreciated from the above equations, the radar system 200 can also resolve targets in relative velocity by means of the FFT processing. However, only the magnitude of the relative velocity can be determined, not the direction. That is the system can not distinguish between incoming or outgoing targets by the spectral components of the DIQ and DII signals alone.

Figure 4:
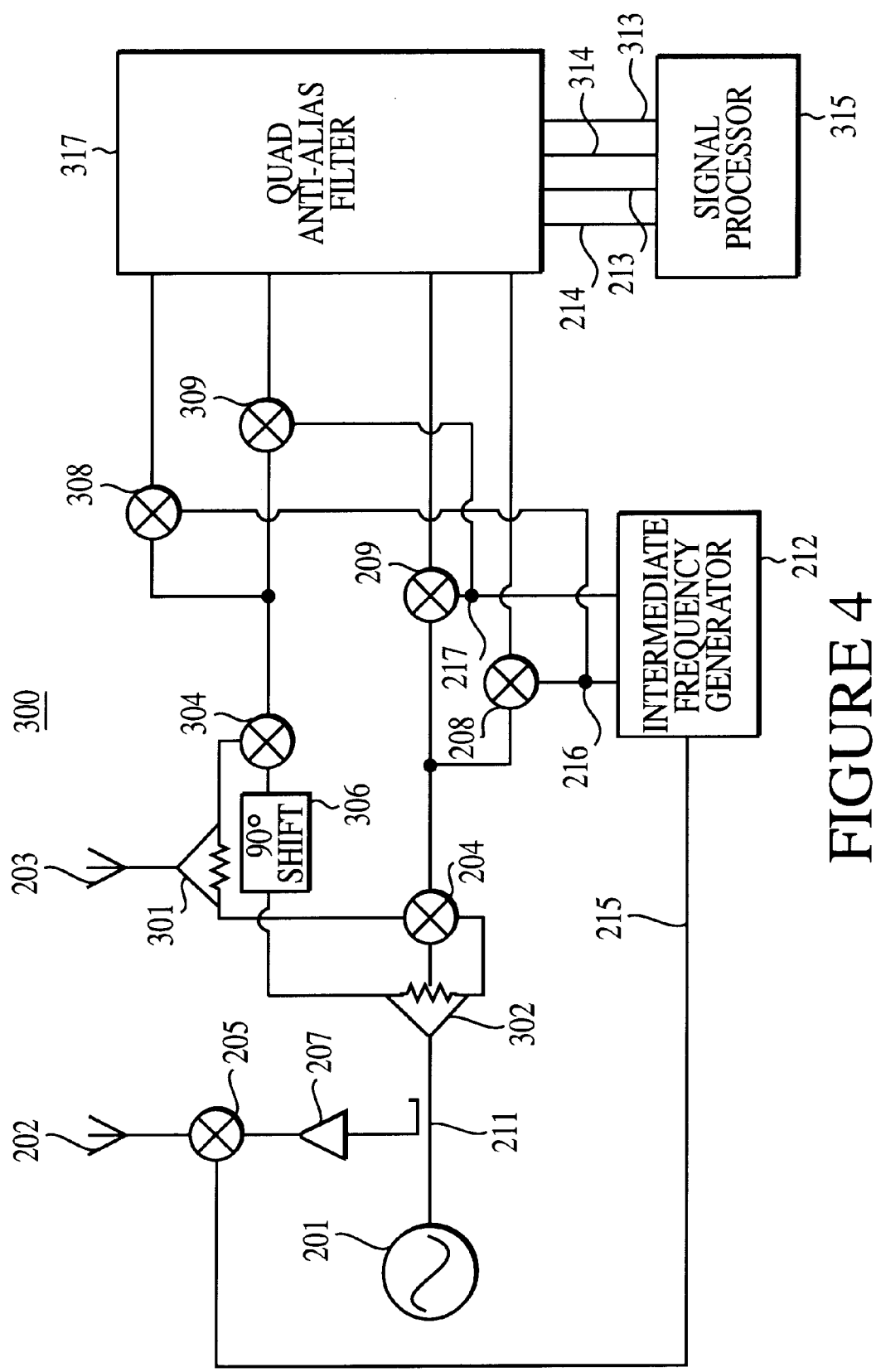
FIG. 4 is a block diagram of a preferred complex radar system in accordance with the present invention.

FIG. 4 is a diagram of another exemplary radar system 300 made in accordance with the present invention. The radar system 300 is a complex DSB heterodyned diplex radar system. The radar system 300 includes all of the components of the radar system 200 of FIG. 3 but further includes components to process the imaginary components of the received target signals. In particular, the radar system 300 further includes a first and a second power splitter 301 and 302, a second RF downconverter 304, a delay circuit 306, a second In-phase downconverter 308, and a second Quadrature downconverter 309. The first power splitter 302 divides the power of the RF signal s(t) between a first and second output. The first output from the power splitter 302 is coupled to the RF downconverter 204. The second output from the power splitter 302 is coupled to the delay circuit 306. In the preferred embodiment the delay circuit 306 causes a 90° phase shift of the RF signal s(t), nominally to $Sin(\omega_o t)$.

The second power splitter 301 divides the power of the received signal $R_{cv}(t)$ between a first and a second output. The first output from the power splitter 301 is coupled to the RF downconverter 204. The second output from the power splitter 302 is coupled to the second RF downconverter 304. The second RF downconverter 304 mixes the phase shifted RF signal s(t+90°) with the receive signal $R_{cv}$ and low pass filters the result to generate a second intermediate IF signal $DQ_{if}$ which nominally is equal to:

$=Sin(\omega_o\tau+\theta_0)Cos((\omega_2-\omega_1)t+\omega_1\tau\theta_0);$ and $=Sin(\omega_1 t+(\omega_0-\omega_1)\tau+(\theta_0-\theta_1))+Cos(-\omega_1 t+(\omega_0+\omega_1)\tau+(\theta_0+\theta_1)).$ The second In-phase IF downconverter 308 mixes the $DQ_{if}$ signal with the In-phase IF signal $I_{if}$ and the quad anti-alias filter 317 anti-alias filters the result to generate a baseband In-phase DQI 314 that nominally is equal to:

$=Sin(\omega_o\tau+\theta_0)Cos((\omega_2-\omega_1)t+\omega_1\tau+\theta_1);$ and $=Sin(-(\omega_2-\omega_1)t+(\omega_0-\omega_1)\tau+(\theta_0-\theta_1))+Sin((\omega_2-\omega_1)t+(\omega_0+\omega_1)\tau+(\theta^0+\theta_1)).$ The second Quadrature IF downconverter 309 mixes the $DQ_{if}$ signal with the Quadrature IF signal $Q_{if}$ and the quad anti-alias filter 317 anti-alias filters the result to generate a baseband Quadrature DQQ 313 which nominally is equal to:

$=Sin(\omega_0\tau+\theta_0)Sin((\omega_2-\omega_1)t+\omega_1\tau+\theta_1);$ and $=Cos(-(\omega_2-\omega_1)t+(\omega_0-\omega_1)\tau+(\theta_0-\theta_1))-((\omega_2-\omega_1)t+(\omega_0+\omega_1)\tau+(\theta_0+\theta_1)).$ By generating both an undelayed IF and a delayed IF signal from downconversion mixers 204 and 304, the radar system 300 becomes a complex receiver and the signal processor 315 can determine whether a target has a positive relative velocity or a negative relative velocity. In particular, due to the phase reference in the IF signals, the upper sideband can be distinguished from the lower sideband upon down-converting the received signals.

It is an advantage of the radar system 300 that is can resolve the velocity direction ambiguity of the prior art system. The information for two targets of opposite directions and the same magnitude of Doppler frequency, e.g., one inbound at $+f_d$ and one outbound at $-f_d$ will have their information appearing in separate FFT Doppler bins. This is possible because in a complex receiver the time domain signals have the form:

$$\mathrm{Exp}(j(\omega_d + \theta_0' - 2\omega_1 R/c)) = \mathrm{Exp}(j(\omega_0(2V/c)t + \theta_0' - 2\omega_1)R/c))$$

Where j equals the square root of minus one. As is well known to one of ordinary skill in the art, the information of targets with $-f_d$ Doppler frequency appear in the $-f_d$ FFT Doppler bin independently of the information of targets with $+f_d$ Doppler frequency, which appear in the $+f_d$ FFT Doppler bin. All that is needed here is to show how target signals received by the complex DSB diplex Doppler radar system 300 can be expressed as a complex rotating phasor time domain signal as given by the above equation. By using Euler's identity the complex rotating phasor time domain signal can be expressed as $\mathrm{Exp}(jX) = \cos(X) + j\sin(X)$ where $$X = (\omega_0 + \omega_1)\tau + \theta_0 = (\omega_d \tau + \theta_0' - 2\omega_1 R/c = \omega_0(2V/c)t + \theta_0' - 2\omega_1 R/c.$$

This condition is satisfied when we form the following lower sideband signals for $\mathrm{Exp}(j((\omega_0 - \omega_1)\tau + \theta_0))$: $\cos(X) = \mathrm{DII} + \mathrm{DQQ}$ and $\sin(X) = \mathrm{DQI} - \mathrm{DIQ}$.

This can be shown by using trigonometric identities. Ignoring scale factors, expanding on the four signals we get:

$$\mathrm{DII} = \cos(\omega_0 \tau + \theta_0)\cos(\omega_1 \tau) = \cos((\omega_0 + \omega_1)\tau + \theta^0) + \cos((\omega_0 - \omega_1)\tau + \theta^0)$$

$$\mathrm{DQQ} = \sin(\omega_0 \tau + \theta_0)\sin(\omega_1 \tau) = \cos((\omega_0 - \omega_1)\tau + \theta_0) - \cos((\omega_0 + \omega_1)\tau + \theta_0)$$

$$\mathrm{DQI} = \sin(\omega_0 \tau + \theta^0)\cos(\omega_1 \tau) = \sin((\omega_0 - \omega_1)\tau + \theta_0) + \sin((\omega_0 + \omega_1)\tau + \theta_0)$$

$$\mathrm{DIQ} = \cos(\omega_0 \tau + \theta_0)\sin(\omega_0 \tau) = \sin((\omega_0 + \omega_1)\tau + \theta^0) - \sin((\omega_0 - \omega_1)\tau + \theta_0)$$

Alternatively, we could form the following upper sideband signals for $\mathrm{Exp}(j((\omega_0 + \omega_1)\tau + \theta_0))$:

$$\cos(X) = \mathrm{DII} - \mathrm{DQQ} \text{ and } \sin(X) = \mathrm{DQI} + \mathrm{DIQ}.$$

Notice that all four of the necessary signals, DII, DQQ, DQI, and DIQ, are formed by the complex DSB diplex Doppler radar system 300. Thus the complex form of the present invention can both determine the direction of targets and resolve inbound and outbound targets with the same Doppler frequency, unlike the prior art system. Another benefit of such complex signal processing is that there are twice as many FFT Doppler bins (target resolution cells) with independent target information, for a given FFT length, than with a real receiver. This helps resolve targets that would otherwise collapse into the same FFT bin, improving target resolution and target detectability in applications with low target velocities (such as in cruise control) or applications with lots of target fluctuations (such as in detecting people walking).

Figure 5A:
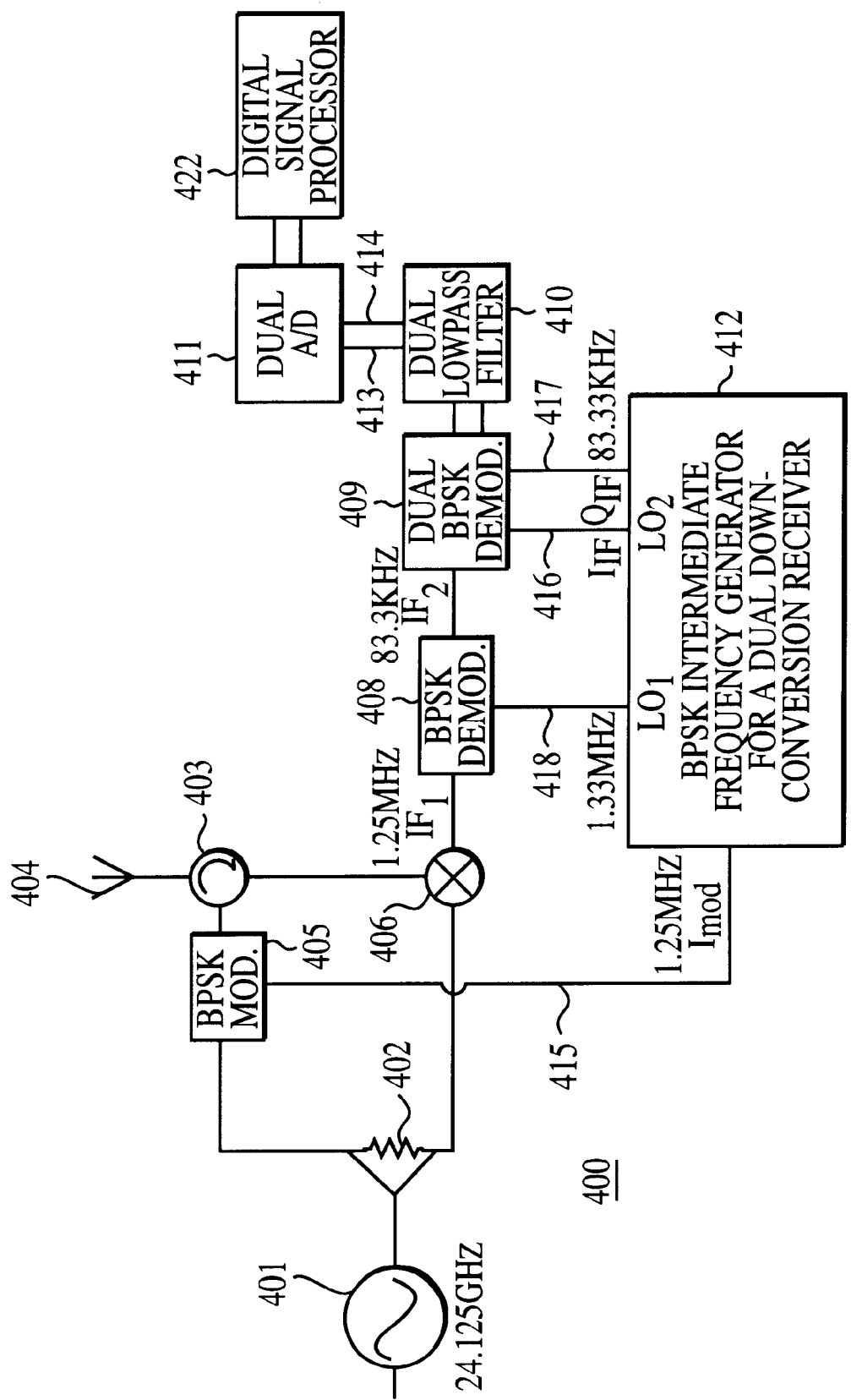
FIG. 5A is a block diagram of another preferred real heterodyned DSB diplex radar system using BPSK IF signals in a dual downconversion receiver made in accordance with the present invention.

Another preferred embodiment of a real heterodyned DSB radar is presented with reference to FIG. 5A. The radar system 400 includes an RF signal generator 401, a power splitter 402, a circulator 403, a receive and transmit antenna 404, a Binary Phase Shift Keying ("BPSK") Modulator 405, an RF receive mixer 406, , a BPSK demodulator 408, a dual BPSK demodulator 409, a Dual Low Pass Filter ("LPF") 410, a Dual Analog-to-Digital ("A/D") converter 411, a BPSK Intermediate Frequency Generator for a Dual Down-conversion Receiver 412, and a Signal Processor 422. As before, the RF signal generator 401 is an RF oscillator that generates an RF signal s(t). The power splitter 402 splits the RF signal s(t) between the BPSK modulator 405 and the RF mixer or downconverter 406. The intermediate frequency generator 412 generates a BPSK intermediate frequency modulation signal, Imod 415, a demodulation signal, $D_{emIn}$ 418 and an In-phase signal and Quadrature IF signal, $I_{if}$ and $Q_{if}$ 416 and 417, respectively. The preferred operation of the IF generator 412 is explained in more detail below.

The BPSK modulator 405 mixes the RF signal s(t) with the $I_{mod}$ signal 415 to generate a transmit signal $X_{mt}(t)$ in a manner known to one of skill in the art. The transmit signal $X_{mt}(t)$ is passed through the circulator 403 to the transmit/receive antenna 404. Note that separate transmit and receive antennas may be employed as shown in FIGS. 3 and 4. The transmitted signal $X_{mt}(t)$ is reflected off targets and received by the antenna 404 and converted to a receive signal $R_{cv}(t)$. The circulator 403 passes the received signal $R_{cv}(t)$ to the RF mixer 406. The RF mixer 406 mixes or downconverts the received signal $R_{cv}(t)$ with the RF signal s(t) to generate an IF signal IF(t) as described above.

The BPSK demodulator 408 downconverts or demodulates the IF signal to a secondary IF frequency $IF_2$ by mixing the signal with the $D_{emIn}$ signal 418. An exemplary BPSK demodulator 408 is described below. The result of this demodulation is a secondary intermediate IF signal. The dual BPSK demodulator 409 downconverts the secondary intermediate IF signal by mixing it with the $I_{if}$ and the $Q_{if}$ signals generated by the IF generator 412. A preferred embodiment of a IF demodulator 409 is also described below. The down converted intermediate IF signals are then low pass filtered by the Dual LPF circuit 410. The demodulation performed by the dual BPSK demodulator 409 and the low-pass-filtering performed by the LPF circuit 410 produce the DII and DIQ signals in a similar manner to those described above. In the embodiment shown, these signals are further processed by the signal processor 422 to determine operation or control data that may be used by a system employing the radar system 400. The dual A/D converter 411 converts the DII and DIQ signals to digital signals DII[n] and DIQ[n]. The DSP circuit 422 may perform numerous signal processing algorithms to interpret information present in these signals, such as the range to targets. Some possible algorithms the DSP 422 may perform are described below in more detail.

Figure 5B:
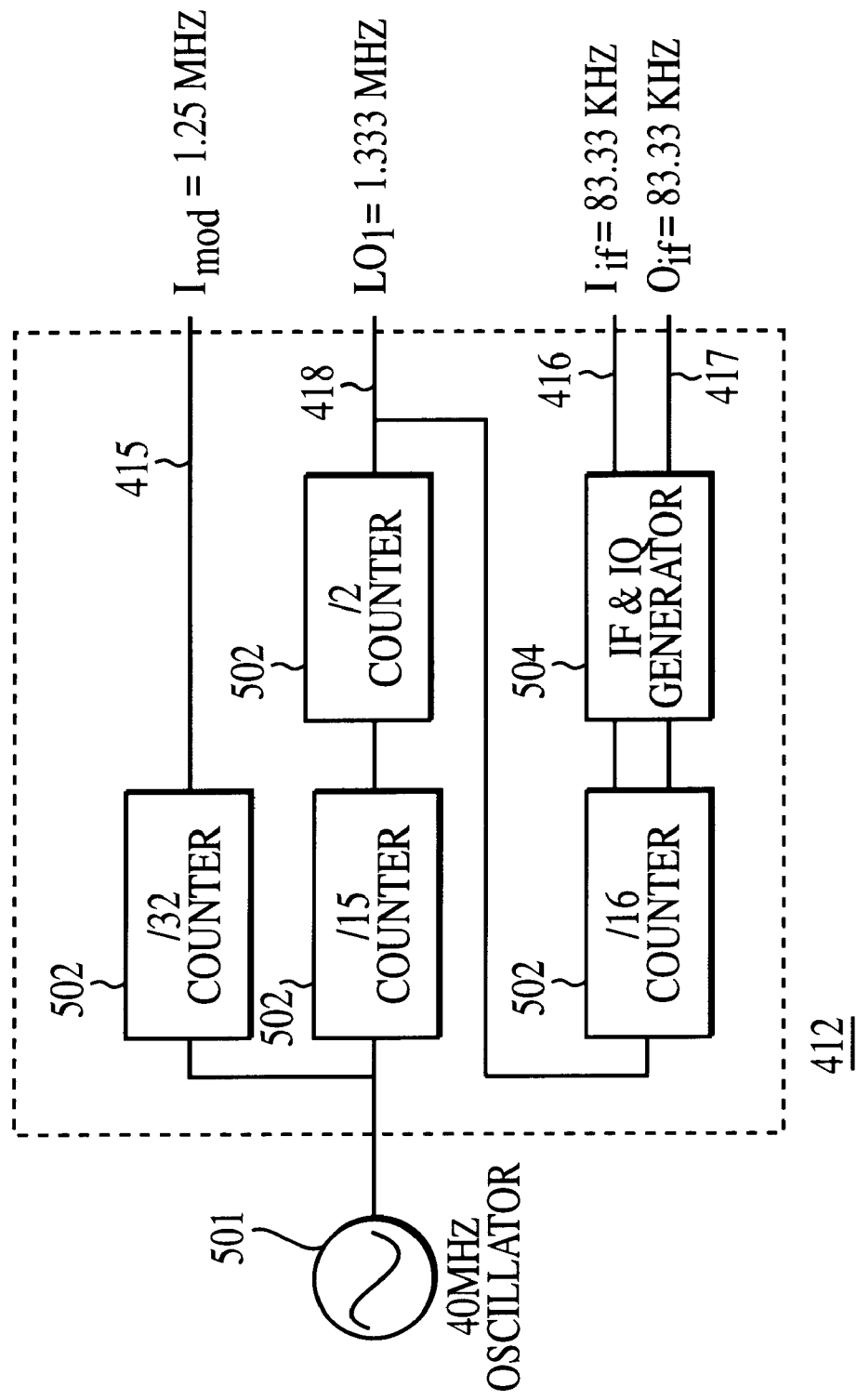
FIG. 5B is a block diagram of an exemplary BPSK IF signal generator for a dual downconversion receiver in accordance with one embodiment of the present invention.

As noted above, the intermediate frequency generator 412 generates the BPSK intermediate frequency modulation signal, $I_{mod}$ 415, a demodulation signal, $D_{emIn}$ 418, and an In-phase signal and Quadrature IF signal, $I_{if}$ and $Q_{if}$ 416 and 417, respectively. A preferred embodiment of an IF generator 412 is shown in FIG. 5B. As shown in FIG. 5B, the IF generator 412 includes a square-wave oscillator 501, counters 502, and an IF and IQ generator 405. In a preferred embodiment, the square-wave generator or oscillator 501 generates square-wave at a 40 MHz rate. The counters 502 generate other square-waves at sub-harmonic frequencies of oscillator 501.

The IF and IQ generator 504 uses the output of the counters 502 to generate I and Q reference signals, $I_{if}$ and $Q_{if}$ at a rate of 83 kHz in a preferred embodiment. A counter 502 is used to generate the $I_{mod}$ signal 415 at a rate of 1.25 MHz.

Two counters 502 are also used to generate the $D_{emln}$ signal 418 at a rate of 1.333 MHZ. Thus, the BPSK IF generator 412 generates the $I_{mod}$, $D_{elin}$, $I_{if}$, and the $Q_{if}$, signals 415, 418, 416, and 417, respectively. These signals are used in the preferred BPSK radar system 400 described above with reference to FIG. 5A.

In one embodiment of the present invention, the IF generator 412 may be implemented in a Programmable Logic Device ("PLD") such as PLD number CY7C373-PLCC available from Cypress® Semiconductor, Inc. The PLD should be programmed to include the counters 502 and I & Q generator 504 necessary to generate the $I_{mod}$, $D_{emln}$, $I_{if}$, and the $Q_{if}$ signals 415, 418, 416, and 417, respectively.

Figure 6:
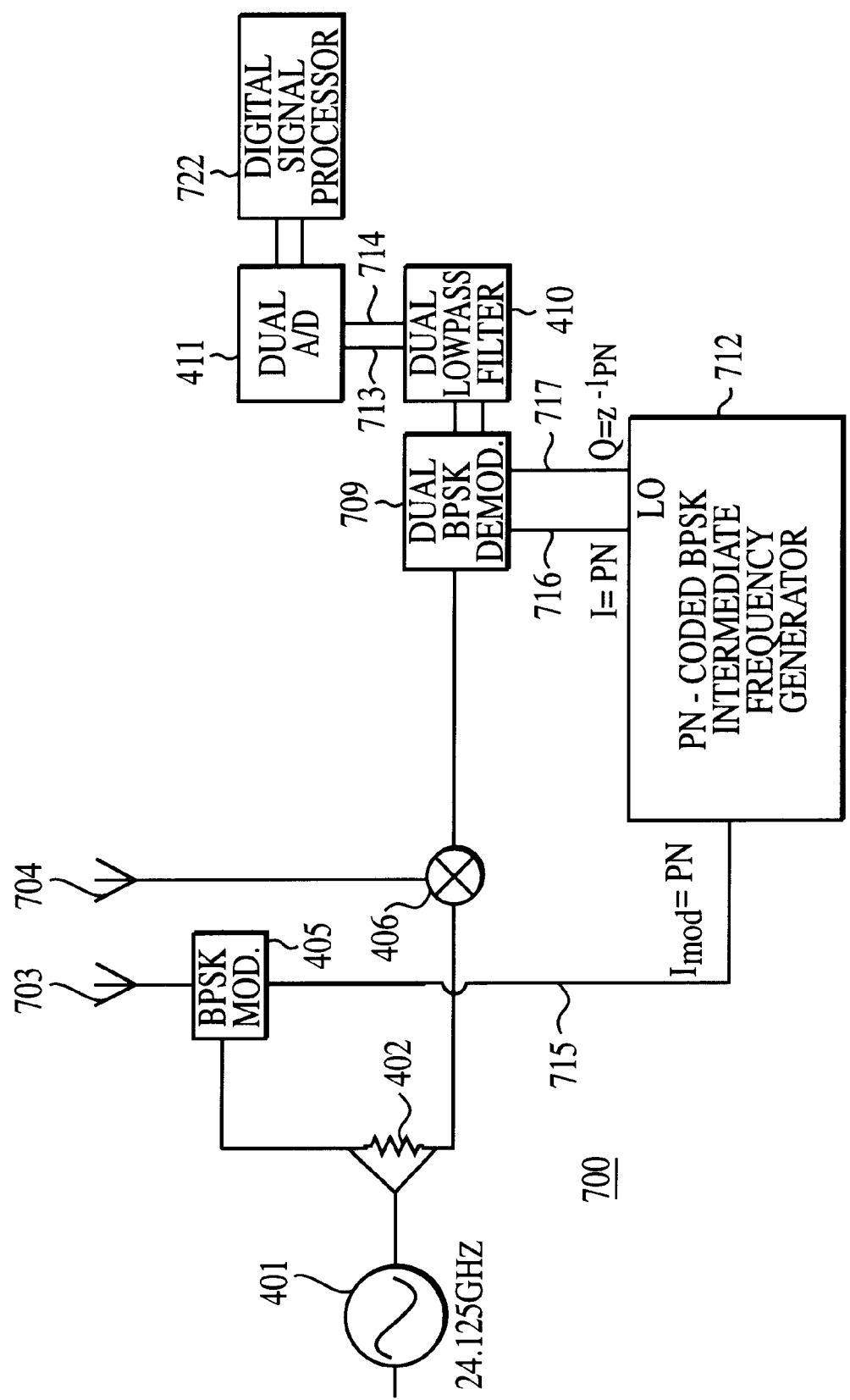
FIG. 6 is a block diagram of another preferred real heterodyned double sideband diplex radar system using PN coded BPSK IF signals in accordance with the present invention.
Figure 7:
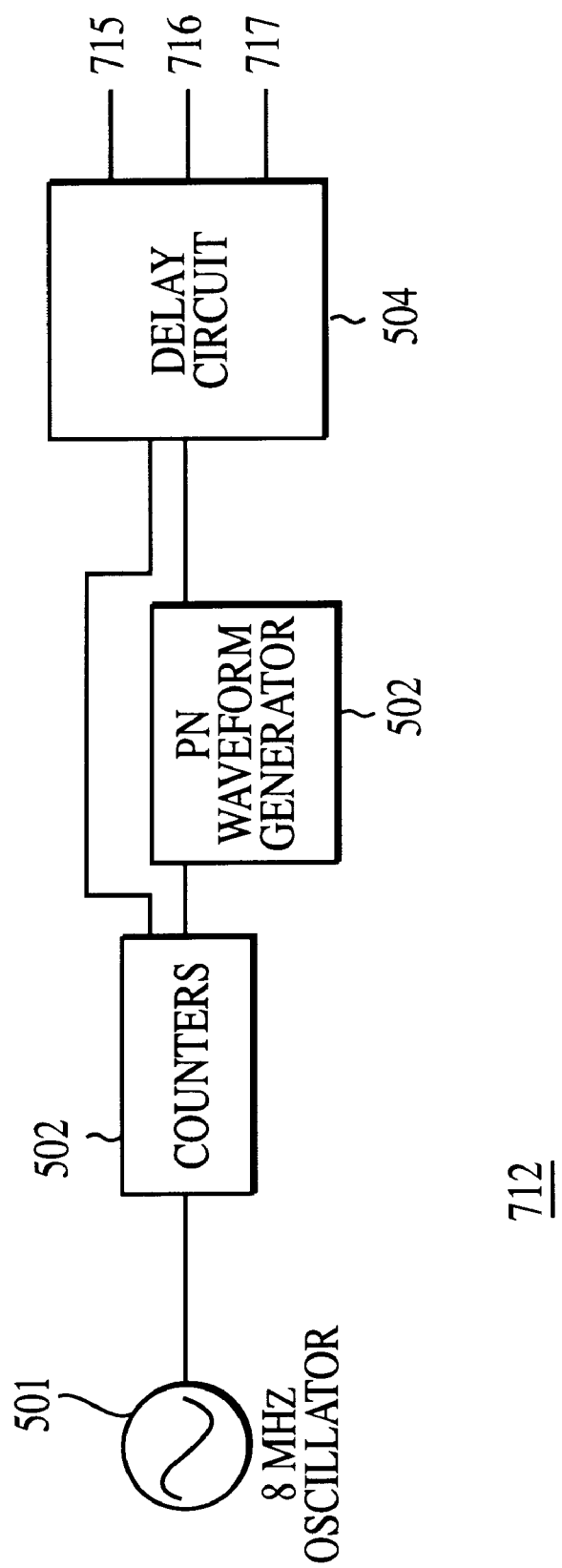
FIG. 7 is a block diagram of an exemplary PN coded BPSK IF signal generator in accordance with one embodiment of the present invention.

Another preferred embodiment of a real heterodyned DSB radar is presented with reference to FIG. 6. The radar system 700 includes an RF signal generator 401, a power splitter 402, a receive antenna 704, a transmit antenna 703, a Binary Phase Shift Keying ("BPSK") Modulator 405, an RF receive mixer 406, a dual BPSK demodulator 709, a Dual Low Pass Filter ("LPF") 410, a Dual Analogto-Digital ("A/D") converter 411, a PN coded BPSK Intermediate Frequency Generator 712, and a Signal Processor 722. In this embodiment, the PN IF generator 712 includes a PN waveform generator 502 (as shown in FIG. 7). As described above, the PN waveform generator 712 generates a Pseudo-random sequence of numbers that are used as the $I_{mod}$ signal 715 and the $D_{emln}$ 716 and $D_{emlp}$ 717 signals. As noted above in the background of the invention, targets that exist physically at a specific range from a prior art radar system may be calculated by the signal processor to appear as positioned at a much closer range when the targets are positioned at a range that is at a range ambiguity of the radar signal, $X_{mt}$. This characteristic of some prior art radar systems can lead to false target data that corrupts or limits the effectiveness of a system employing the radar. Consequently, it is desirable to mask or filter out targets that are physically positioned at a range greater than some maximum range (ideally before range ambiguities occur). It may also be desirable to mask signals of targets that are too close to the system in some applications.

The present invention, in particular the IF generator 712 as shown in FIGS. 6 and 7 adds a PN code to the $I_{mod}$ signal 715 and the $D_{emln}$ 716 and $D_{emlp}$ 717 signals to effectively mask or filter targets at undesirable or unimportant ranges or distances from the radar system. The addition of different PN sequences to these signals enables the radar system 700 to limit the maximum delay (round trip travel time of the $X_{mt}$ signal to a target) and thus the maximum range of targets to be detected by the system. The dual BPSK demodulator 709 (FIG. 6) suppresses targets positioned beyond some desirable maximum range. The IF generator 712 generates the $I_{mod}$ signal 715 with a zero or small delay relative to the $D_{emln}$ 716 and $D_{emlp}$ 717 signals although these signals are all derived from the same PN sequence. By appropriately selecting PN sequences as described below, targets having a range greater than a maximum range (having a round-trip propagation delay time greater than the delay between the $D_{emln}$ 716 and $D_{emlp}$ 717 signals) shall be highly decorrelated with the $D_{emln}$ and $D_{emlp}$ signals. Accordingly, during the demodulation process in the dual BPSK demodulator 709, the range information for these targets is suppressed. Thus, targets that are positioned beyond some maximum range are not as readily detected by a radar employing the IF generator 712 made according to the present invention. Most importantly, targets that are positioned at most of the ranges that are in between multiples of the range ambiguity of the radar signal $X_{mt}$ will not be detected.

The PN code preferably comprises a predetermined number of digital bits. The digital bits are used to BPSK modulate the RF transmit signal $X_{mt}$. Numerous random sequences may be employed to encode either the RF transmit signal $X_{mt}$ directly or indirectly by encoding the $I_{mod}$ signal. The random sequence should have an autocorrelation function that falls to a minimum according to the shape of the desired STC($\tau$) and range ambiguity functions desired. The length of the STC function is preferably equal to the maximum round trip propagation delay of a signal propagating to a target at a maximum desirable range. Preferably, the selected minimum value of the autocorrelation function is sufficiently low to prevent range ambiguity of targets by reducing the energy of any signal reflected from targets that are beyond the desired maximum detected range. In radar applications, the autocorrelation function is the sensitivity time constant ("STC ($\tau$)") function where the sensitivity of the radar receiver is determined by the amount of time required for the transmit signal to reach a target and return back to the radar.

Figure 9A:
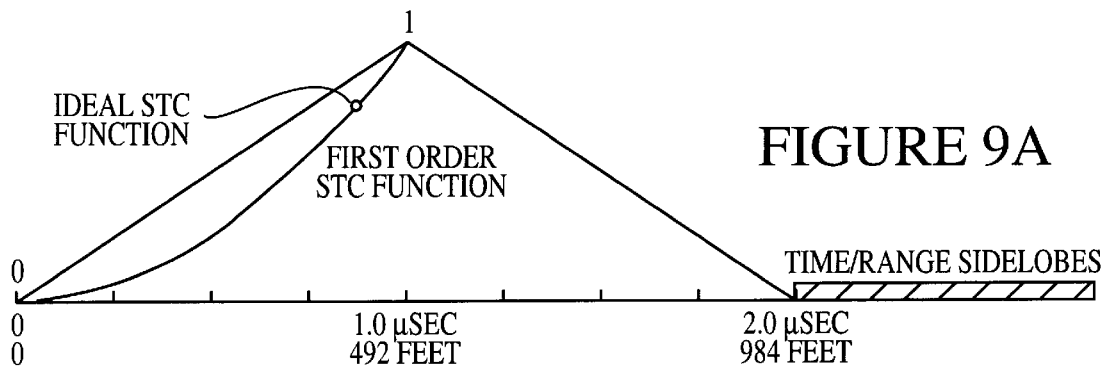
FIGS. 9a–c show plots of desirable first, second, and fourth-order STC ($\tau$) functions.
Figure 9B:
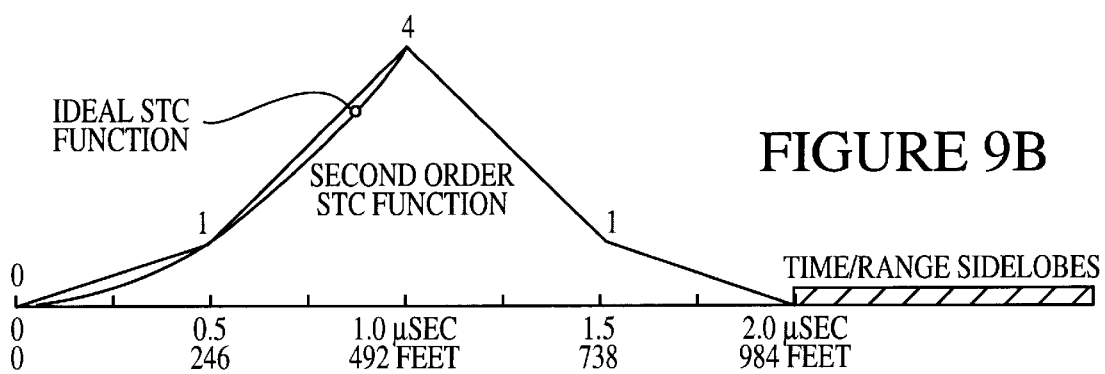
Figure 9C:
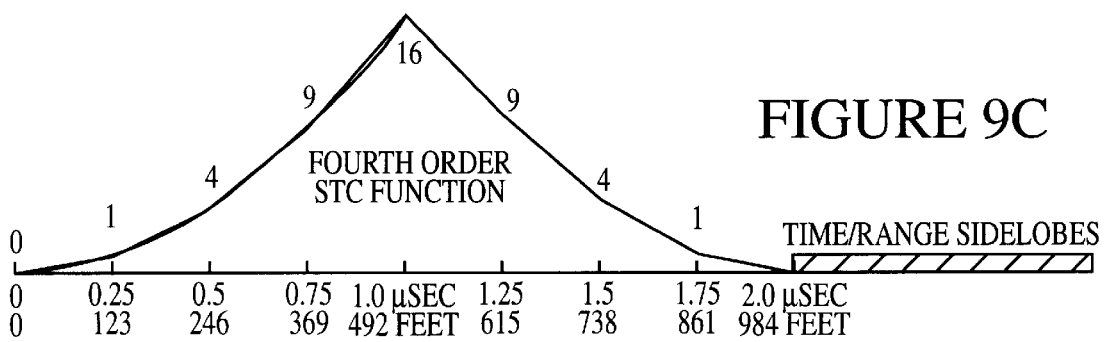

FIGS. 9a–c show plots of desirable first, second, and fourth order STC ($\tau$) functions. These STC($\tau$) functions are desirable because they attenuate signals from targets that are beyond a predetermined desirable maximum detectable range. In a preferred embodiment the maximum detectable range is 984 feet. In other applications, the maximum range can vary. Accordingly, the STC($\tau$) function can be modified so the function has a maximum value at the maximum desirable range. The dashed line in FIG. 9a represents the plot of an ideal STC($\tau$) function. The ideal STC ($\tau$) function has a curve proportional to $R^4$ where the amplitude of the receive signal attenuates with the range, R.

As noted above, the IF generator 712 uses a PN waveformn generator 506 to generate a PN code or sequence to modulate the IF signals. It has been found that the 16-bit PN code sequence of 0000 1001 0111 0111 generates a relatively ideal STC($\tau$) and range ambiguity function. In particular, this PN code generates a radar signal having the STC($\tau$) and range ambiguity function shown in FIG. 12. FIG. 9b is a plot of an ideal second order STC($\tau$) function. It has been found that an approximation of such an ideal second order STC($\tau$) function can be generated by superimposing a second PN code sequence on the first PN code sequence where the second PN code sequence has approximately half the chip time (effective delay or thereby twice the number of digital bits) of the first PN code and is delayed by two chip times. An alternative implementation would be to select a single PN code that has the same STC($\tau$) function as shown in FIG. 9B. FIG. 9c is a plot of an ideal fourth order STC($\tau$) function. It has also been found that an approximation of such an ideal fourth order STC($\tau$) function can be generated by superimposing a third and fourth PN code sequence on the first and second PN code sequence where the third and fourth PN code sequence has approximately half the chip time (effective delay or thereby twice the number of digital bits) of the second PN code and is delayed by four chip times (the oscillator 501 and the counters 502 determine the "chip time" which is equal to the dwell time of each bit of the PN code.) Other STC($\tau$) function synthesis techniques may exist.

Figure 10:
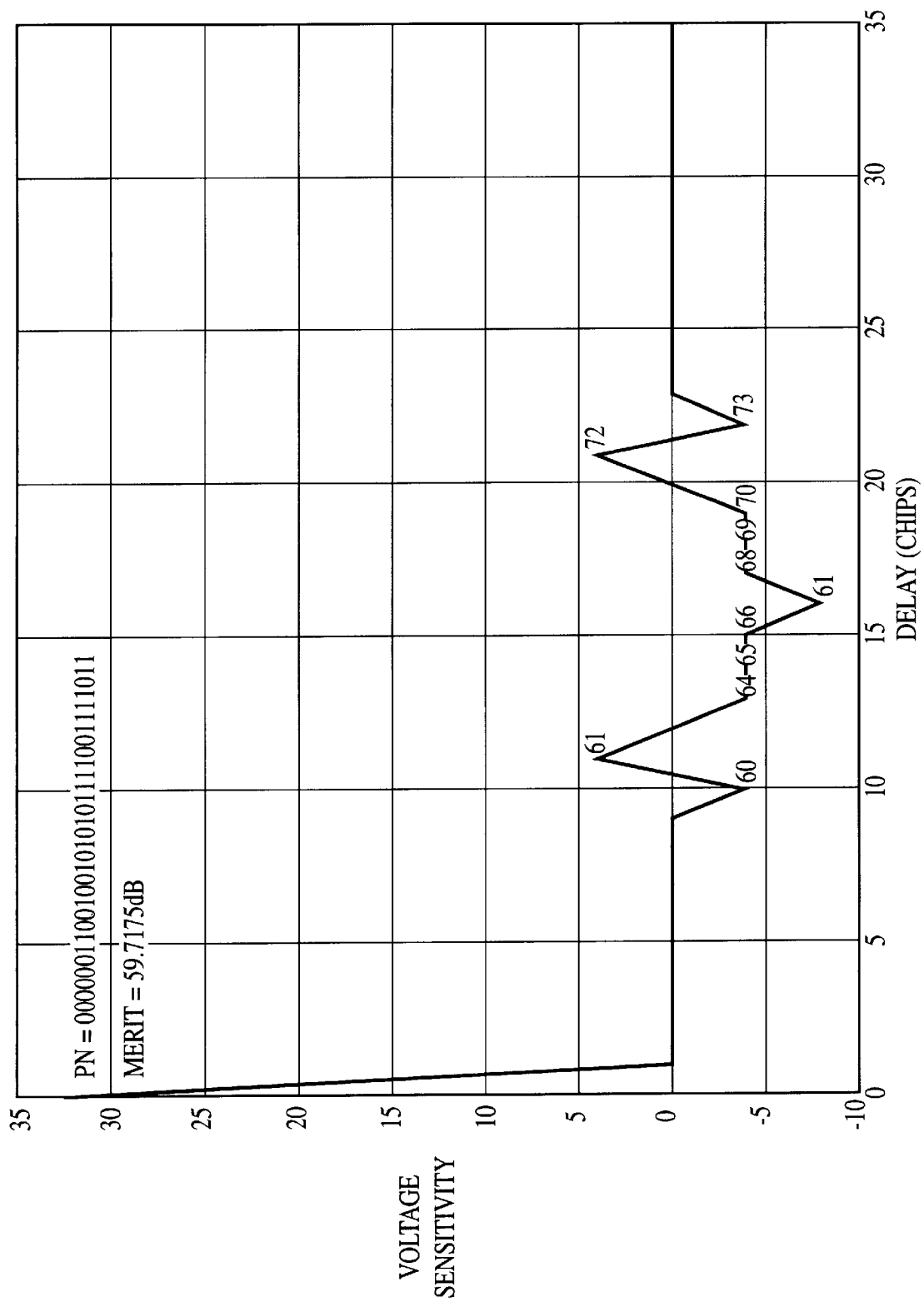
FIGS. 10–16 are plots of additional STC ($\tau$) functions in accordance with the present invention.
Figure 11:
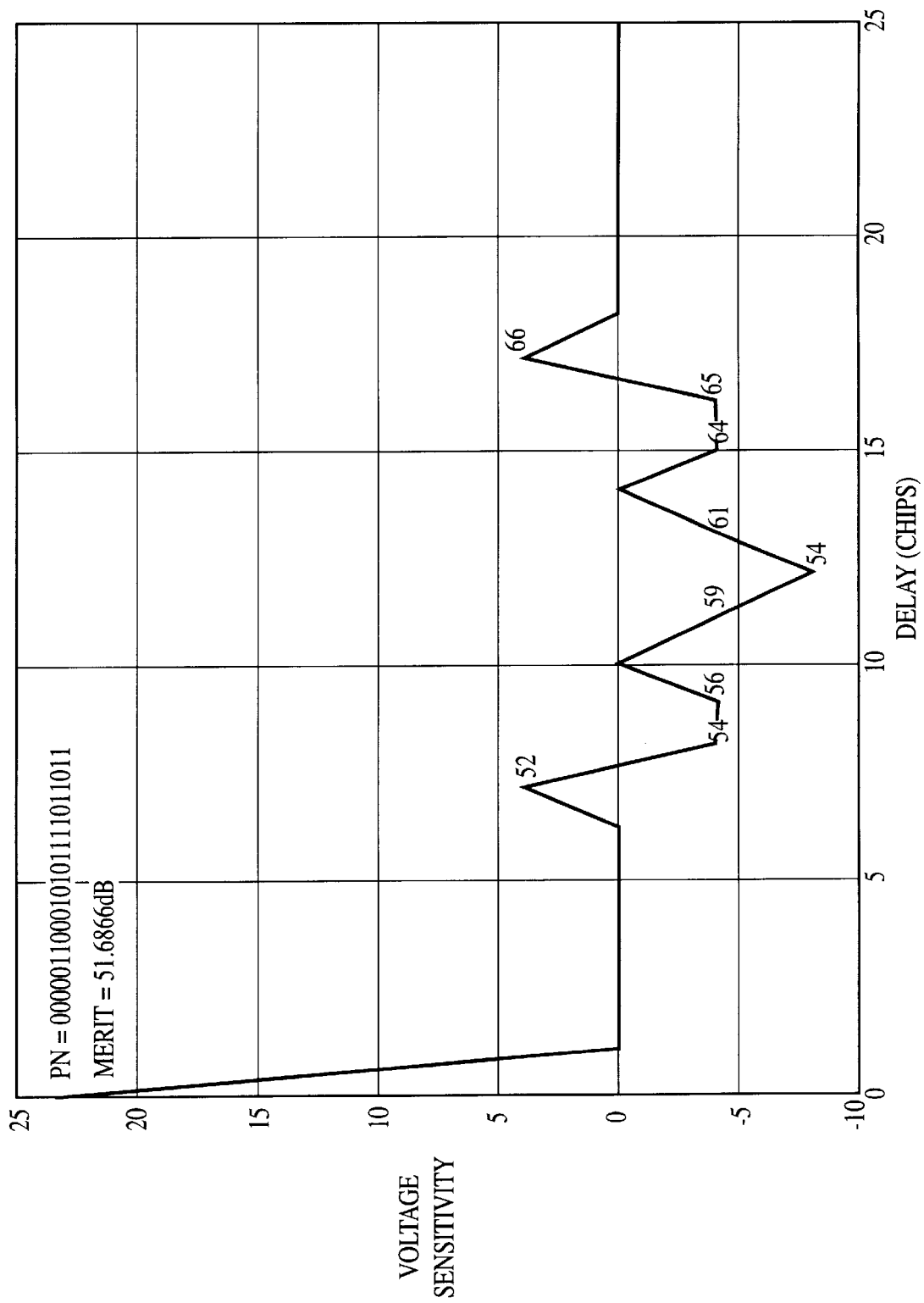
Figure 12:
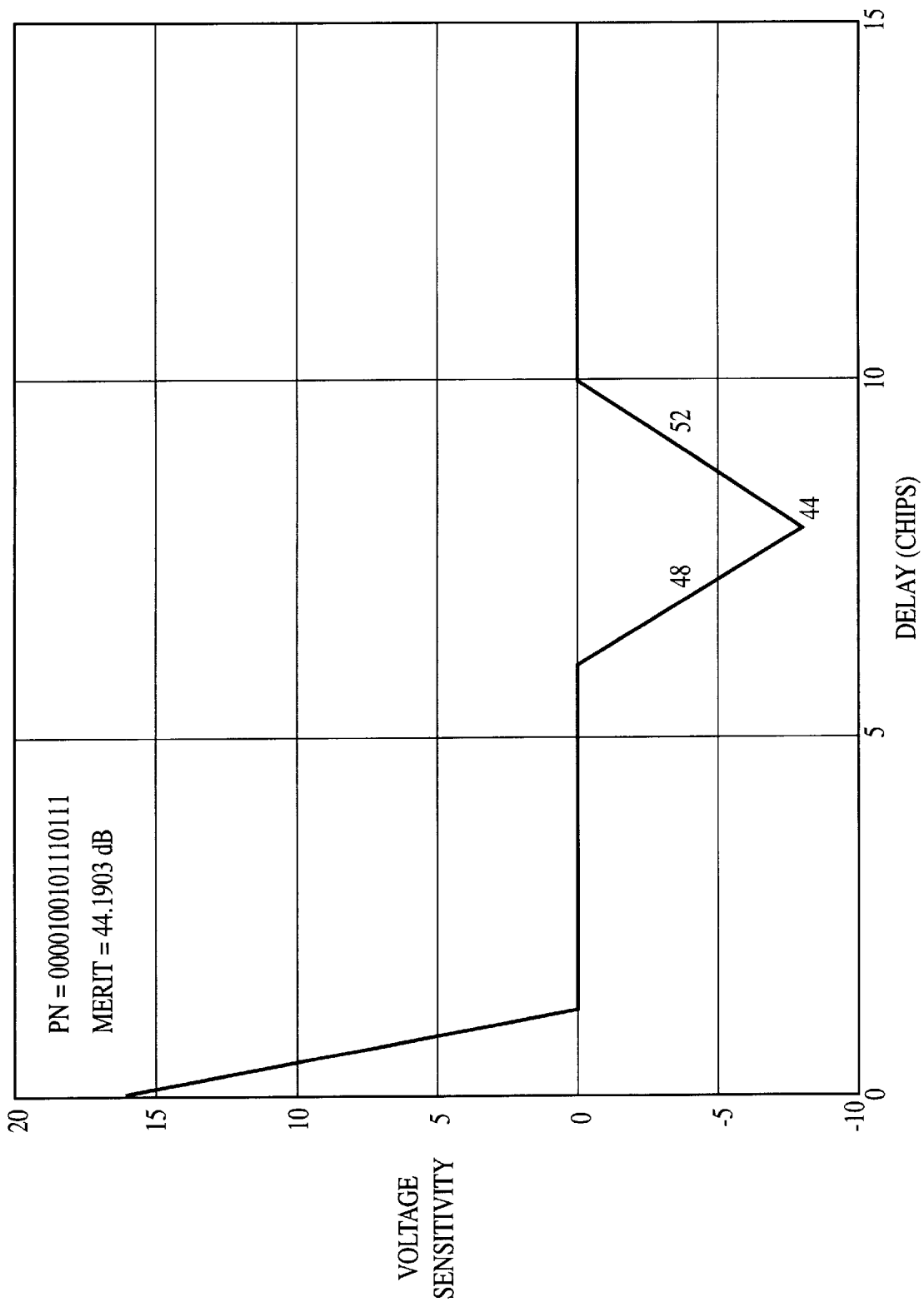
Figure 13:
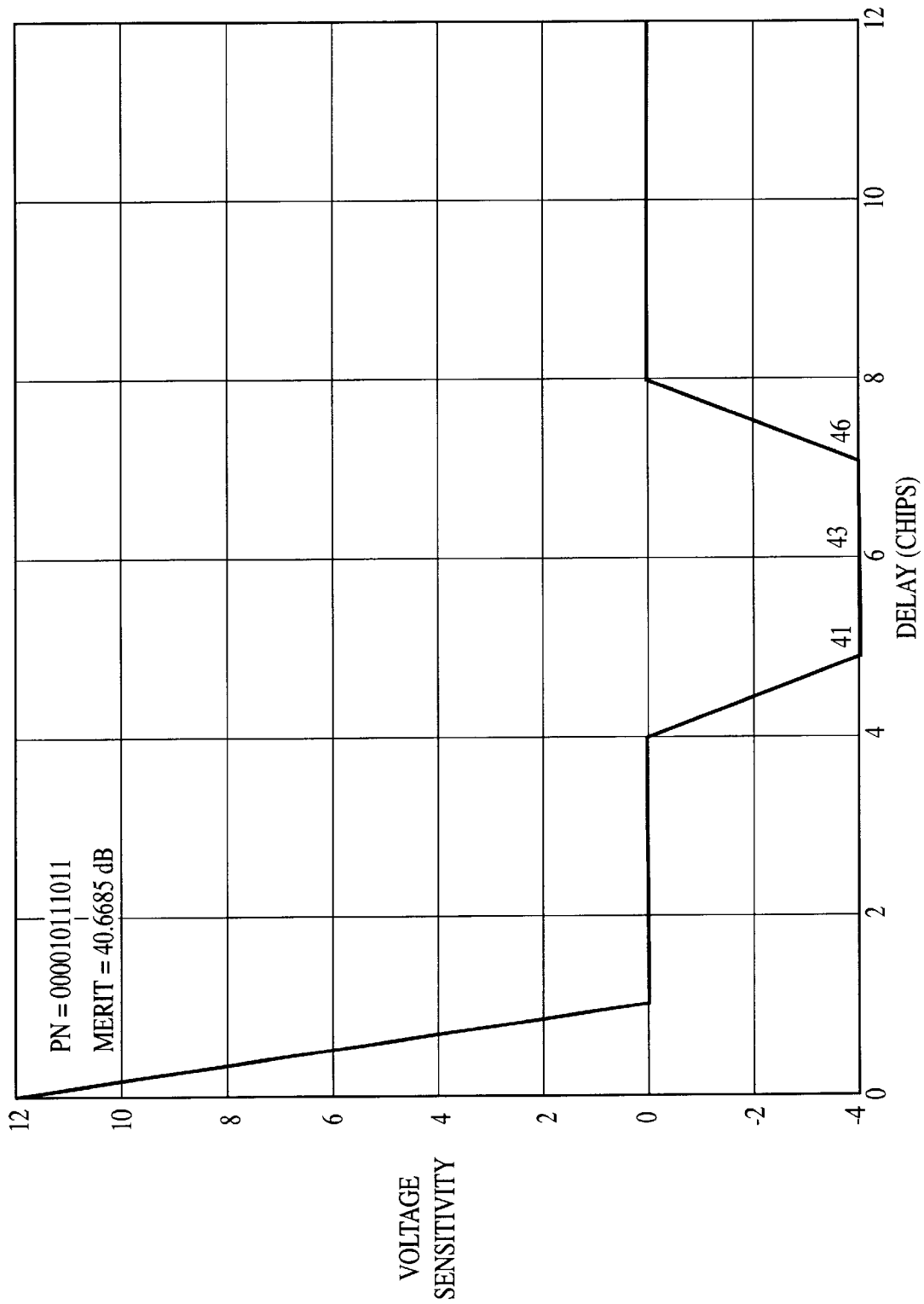
Figure 14:
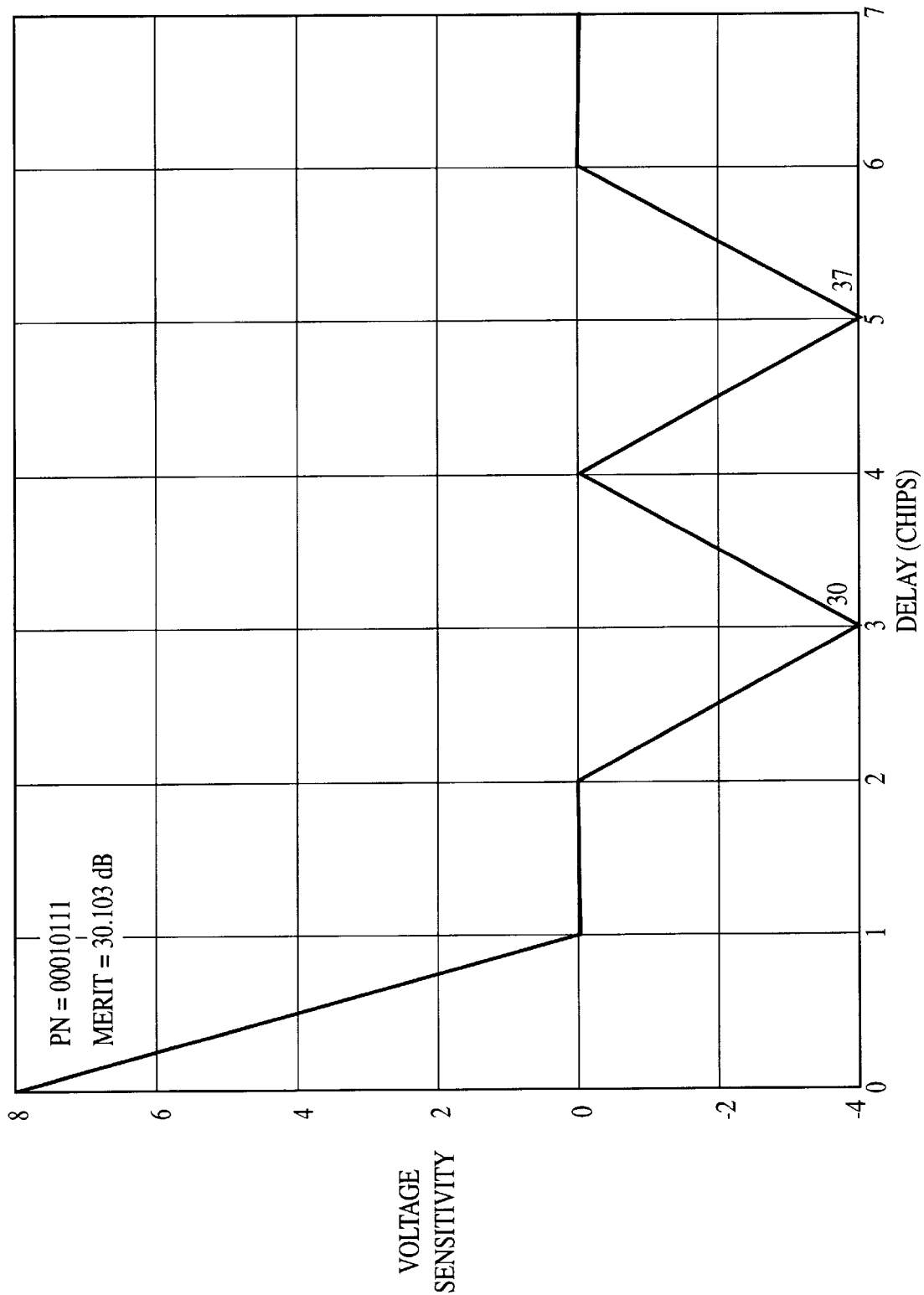
Figure 15:
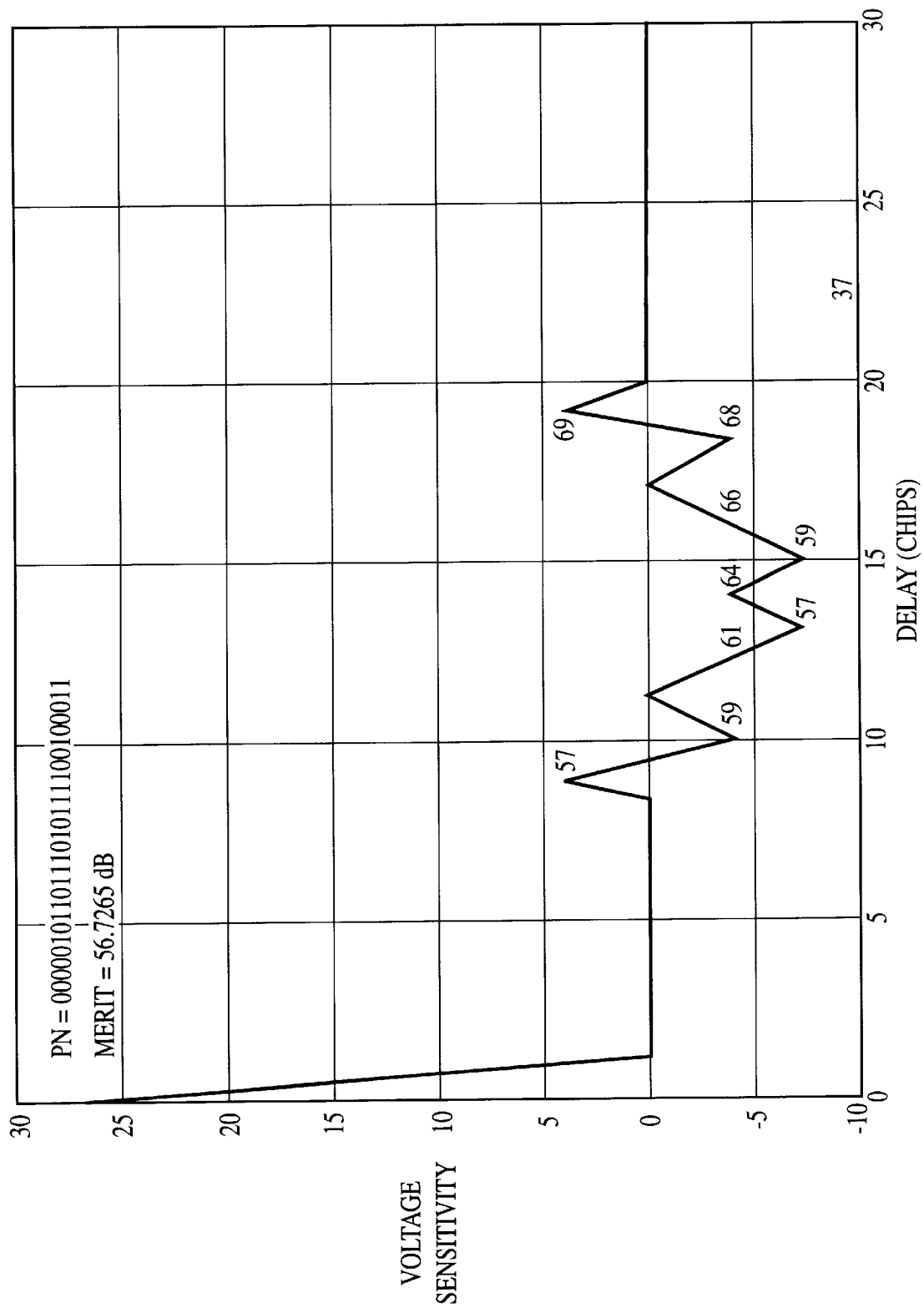
Figure 16:
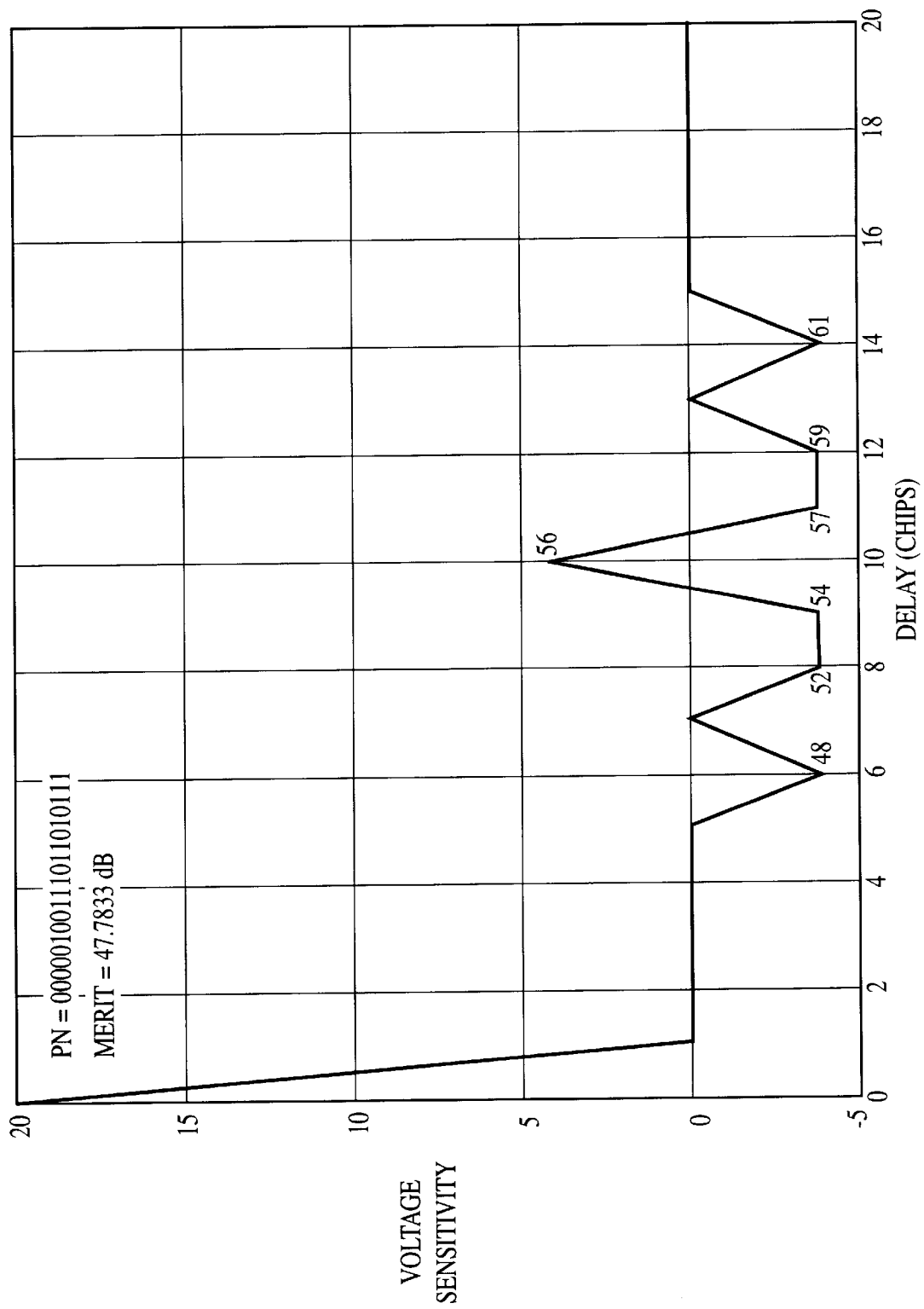

As will be appreciated by one of skill in the art, different PN codes and different length PN codes will yield different STC($\tau$) and range ambiguity functions. Some exemplary STC($\tau$) and range ambiguity functions are shown in FIGS. 10–16. The exemplary STC($\tau$) and range ambiguity function shown in FIG. 10 is generated by the 32-bit PN code equal to 0000 0011 0111 1001 1110 1010 1001 0011. It has been found that this particular 32-bit PN sequence yields the first order STC (τ) function shown in FIG. 9A and has one of the best range ambiguity functions of all 32-bit codes (excluding rotations, inversions and bit-reversals, which always have the same autocorrelation function). Likewise, the exemplary STC(τ) and range ambiguity function shown in FIG. 11 is generated by the 24-bit PN code equal to 0000 0110 0010 1011 1101 1011. Similarly, the exemplary STC(τ) and range ambiguity function shown in FIG. 12 is generated by the 16-bit PN code equal to 0000 1001 0111 0111. Likewise, the exemplary STC(τ) and range ambiguity function shown in FIG. 13 is generated by the 12-bit PN code equal to 0000 1011 1011. The exemplary STC(r) and range ambiguity function shown in FIG. 14 is generated by the 8-bit PN code equal to 0001 0111. The exemplary STC(τ) and range ambiguity function shown in FIG. 15 is generated by the 28-bit PN code equal to 0000 0101 1011 1010 1111 0010 0011. Finally, the exemplary STC(τ) and range ambiguity function shown in FIG. 16 is generated by the 20-bit PN code equal to 0000 0100 1110 1101 0111.

Note that the implementation of a modulation scheme that generates a transmit signal $X_{mt}$ that has an STC(τ) function approximating those plotted in FIGS. 10–16 provides several advantages. In particular, near range targets are attenuated. In embodiments employing the radar system 700 on a vehicle this may reduce near range targets, i.e., signals reflected off the surface of pavement in close proximity to the vehicle. Further, the effects of signal attenuation over long range (i.e., "$R^4$ effects") are handled by the range ambiguity function which have very low range sidelobes for these PN codes. Thus, components in a receiver of a radar system generating such a STC(τ) function need not have great dynamic range. This makes the overall radar system less expensive. In addition, the number of A/D bits that are required for the same accuracy and performance are reduced due to the reduction in dynamic range. As also noted above, long-range targets, i.e., targets beyond a maximum range, will be attenuated at a rate greater than the $R^4$ effect. Thus, ambiguous range targets will be attenuated to a level so that they need not or will not be considered. Further, the transmit signal $X_{mt}$ can be used at a 100% duty cycle. Thus, the radar system 700 does not need the transmitter to shut down during the periods of time when ambiguous range targets are expected to be received, or transmit a "parking" frequency which results in an unusable IF signal. Therefore, the signal-to-noise ratio of the receiver is improved compared to the prior art radar system.

Figure 8A:
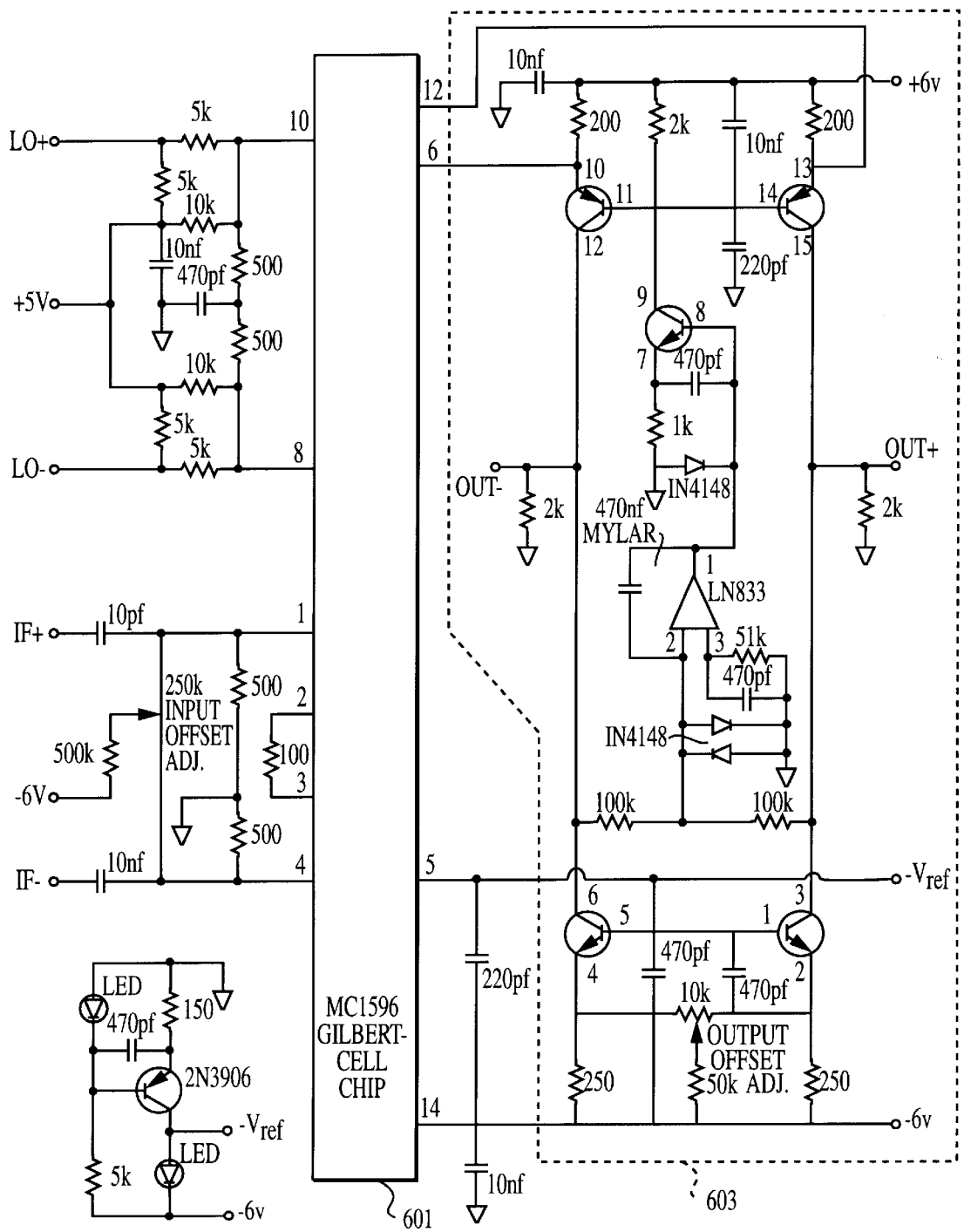
FIG. 8A is a schematic diagram of an exemplary BPSK demodulator in accordance with the present invention.

As described above with reference to FIG. 5A, the BPSK demodulator 408 downconverts or demodulates the IF signal by mixing the signal with the $D_{emln}$ signal 418. The result of this demodulation is a second intermediate IF signal having a frequency of 83.33 KHz where the $D_{emln}$ signal 418 has a frequency of 1.3333 MHz. A detailed schematic diagram of an exemplary BPSK demodulator 408 is shown in FIG. 8A. As shown in FIG. 8A, the demodulator 408 preferably includes a Gilbert cell multiplier circuit 601 and a level shifter circuit 603. The Gilbert cell 601 down-converts the 1.25 MHz $I_{mod}$ signal to differential 83.33 kHz IF signal when the 1.333 MHz $D_{emln}$ signal is coupled to the Gilbert cell 601. The level shifter circuit 603 interfaces the differential 83.33 kHz IF signal to the dual BPSK IF demodulator 409 (FIG. 5A) for further processing.

Figure 8B:
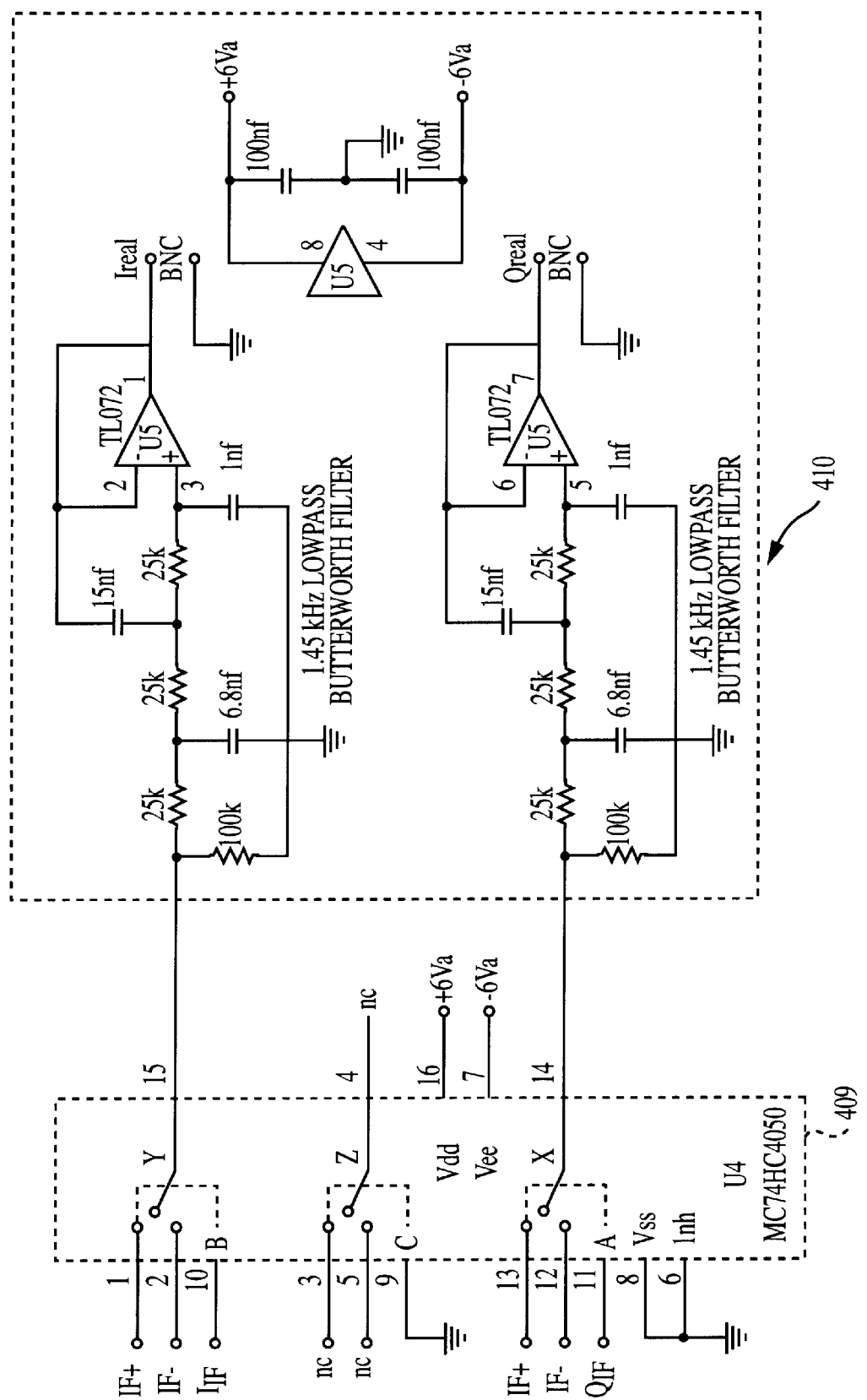
FIG. 8B is a schematic diagram of a dual BPSK demodulator and low pass filter in accordance with present invention.

The dual BPSK IF demodulator 409 (FIG. 5A) downconverts the differential IF signal generated by the BPSK demodulator 408 by mixing the signals output by the level shifter circuit 603 with the $I_{if}$ and the $Q_{if}$ signals generated by the IF generator 412. A preferred embodiment of the IF demodulator 409 and the LPF circuit 410 is shown in FIG. 8B. The down converted IF signals are low pass filtered by the LPF circuit 410. The result of the demodulation by the IF demodulator 409 and the low pass filtering by the LPF circuit 410 are the DII and DIQ signals described above. As shown in FIG. 8B, the IF demodulator 409 includes a collection of analog switches whose operation is controlled by the two digital signals $I_{if}$ and $Q_{if}$. The $I_{if}$ and $Q_{if}$ signals are synchronized with the $I_{mod}$ and $D_{emln}$ signals as each of these signals are derived from the same 40 MHz clock 501. The switches of the IF demodulator 409 effectively demodulate the differential BPSK IF signals. This results in the quadrature, baseband DII and DIQ signals at the Doppler frequency. The LPF circuit 410 includes a pair of conventional low pass Butterworth filters that are used to anti-alias filter the DII and the DIQ signals generated by the IF demodulator 409.

As described above with reference to FIGS. 5A and 6A, the radar system 400 and 700 preferably also include circuitry to determine the target range information present in the resultant DII and DIQ signals. The circuitry includes a dual or stereo Analog-to-Digital ("A/D") converter 411 and a Digital Signal Processing ("DSP") circuit 422 and 722 to determine the target range information contained in the DII and DIQ signals. The A/D converter 411 converts the analog DII and DIQ signals to digital DII[n] and DIQ[n] signals for processing by the DSP circuit 422 and 722. The DSP 422 and 722 first performs a Fast Fourier Transform ("FFT") (ie., translates the DII and DIQ signals from time domain signals to frequency domain signals) on the DII and DIQ signals. The frequency domain DII[f] and DIQ[f] signals are processed to determine target range and other information about the targets. In complex radar systems such as the radar system 300 of FIG. 4, the frequency domain information would include FFT bins representing negative and positive target Doppler frequency data. In real radar systems such as the radar systems 200 (FIG. 3) described above, the frequency domain information would only include FFT bins representing the magnitude of target Doppler frequency data.

The target information present in the FFT frequency bins may be used for many different applications. For example, the information may be used to determine the range of targets and then used to control the operation of a vehicle to avoid collision with targets or to modify the velocity of the vehicle (cruise control) accordingly. U.S. Pat No. 5,302,956 issued on Apr. 4th, 1994 to Jimmie Asbury, et al., and assigned to the owner of the present application provides an example of such an exemplary application. This patent is incorporated by reference herein for its teachings on the use of the target information present in the FFT frequency bins.

Several embodiments of the present invention have been described herein. One of skill in the art will appreciate that modifications may be made to these embodiments without departing from the spirit and scope of the invention. For example, the transmit signal $X_{mt}$ may be encoded with a PN code or sequence at any point within the transmit channel. Accordingly, it is to be understood that the invention is not to be limited by the specific illustrated embodiments, but only by the scope of the appended claims.

What is claimed is:

1. A radar system for determining the range of targets, the system comprising:
   (a) an RF signal generator, the generator generating an RF signal;
   (b) an IF frequency generator, the IF frequency generator generating an IF modulation signal, an in-phase IF modulation signal, and an out-of-phase IF modulation signal;

(c) an IF modulator coupled to the RF signal generator and IF frequency generator, the IF modulator mixing the RF signal and the IF modulation signal to generate a transmit signal;

(d) an RF downconverter coupled to the RF signal generator, the RF downconverter mixing a received signal and the RF signal to generate an intermediate IF signal;

(e) an in-phase IF demodulator coupled to the RF downconverter and the IF frequency generator, the in-phase IF demodulator mixing the intermediate IF signal and the in-phase IF modulation signal to generate an in-phase baseband signal; and (f) an out-of-phase IF demodulator coupled to the RF downconverter and the IF frequency generator, the out-of-phase IF demodulator mixing the intermediate IF signal and the out-of-phase IF modulation signal to generate an out-of1 phase baseband signal, wherein the ratio of the amplitudes of the in-phase baseband signal and the out-of-phase baseband signal includes information about the range of the targets.

2. The radar system according to claim 1, further comprising a transmit antenna coupled to the IF modulator, the transmit antenna converting the transmit signal to an electromagnetic wave.

3. The radar system according to claim 2, further comprising a receive antenna coupled to the RF downconverter, the receive antenna receiving electromagnetic waves and converting them to the receive signal.

4. The radar system according to claim 1, wherein the IF frequency generator modulates the IF modulation signal with a pseudo random sequence.

5. The radar system according to claim 4, wherein the IF frequency generator modulates the in-phase IF modulation signal and the IF out-of-phase modulation signal with the pseudo random sequence.

6. The radar system according to claim 4, wherein the pseudo random sequence is 32 bits.

7. The radar system according to claim 6, wherein the pseudo random sequence is equal to one of 0000 0011 0111 1001 1110 1010 1001 0011 and any combination of inversion, bit-reversal, and rotation thereof.

8. The radar system according to claim 4, wherein the pseudo random sequence is 24 bits.

9. The radar system according to claim 8, wherein the pseudo random sequence is equal to one of 0000 0110 0010 1011 1101 1011 and any combination of inversion, bit reversal, and rotation thereof.

10. The radar system according to claim 4, wherein the pseudo random sequence is 16 bits.

11. The radar system according to claim 10, wherein the pseudo random sequence is equal to one of 0000 1001 0111 0111 and any combination of inversion, bit-reversal, and rotation thereof.

12. The radar system according to claim 4, wherein the pseudo random sequence is 12 bits.

13. The radar system according to claim 12, wherein the pseudo random sequence is equal to one of 0000 1011 1011 and any combination of inversion, bit-reversal, and rotation thereof.

14. The radar system according to claim 4, wherein the pseudo random sequence is 8 bits.

15. The radar system according to claim 14, wherein the pseudo random sequence is equal to one of 0001 0111 and any combination of inversion, bit-reversal, and rotation thereof.

16. The radar system according to claim 1, wherein the IF frequency generator includes:

a) an oscillator, the oscillator generating a predetermined clock rate; and b) a plurality of counters coupled to the oscillator, the plurality of counters generating at least two different signals each signal have a different clock rate.

17. The radar system according to claim 16, wherein the clock rate of one of the at least two different signals corresponds to a clock rate of the IF modulation signal and the clock rate of the other of the at least two different signals corresponds to a clock rate of the in-phase IF modulation signal and the out-of-phase IF modulation signal.

18. The radar system according to claim 17, wherein the IF modulation signal has a clock rate of 1.25 MHz, the in-phase IF modulation signal and the out-of-phase IF modulation signal have a clock rate 83.33 KHz.

19. The radar system according to claim 17, wherein the IF frequency generator further includes a pseudo random number generator coupled one of the plurality of counters, the pseudo random number generator generating a predetermined sequence of numbers.

20. The radar system according to claim 19, wherein the IF frequency generator further includes a delay circuit coupled to the pseudo random number generator, the delay circuit adding a fixed delay to the predetermined sequence of numbers.

21. A radar system for determining the range of targets, the system comprising:

(a) an RF signal generator, the generator generating an RF signal;

(b) a BPSK IF frequency generator, the BPSK IF frequency generator generating a BPSK IF modulation signal, a secondary IF modulation signal, an in-phase IF modulation signal, and an out-of-phase IF modulation signal;

(c) a BPSK modulator coupled to the RF signal generator and IF frequency generator, the BPSK modulator mixing the RF signal and the BPSK IF modulation signal to generate a transmit signal;

(d) an RF downconverter coupled to the RF signal generator, the RF downconverter mixing a received signal and the RF signal to generate a first intermediate IF signal;

(e) a BPSK demodulator coupled to the RF downconverter and the BPSK IF frequency generator, the BPSK demodulator mixing the first intermediate IF signal and the secondary IF modulation signal to generate a second intermediate IF signal;

(f) a dual BPSK demodulator coupled to the BPSK demodulator and the BPSK IF frequency generator, the dual BPSK demodulator mixing the second intermediate IF signal and the in-phase IF modulation signal to generate an real in-phase baseband signal and mixing the second intermediate IF signal and the out-of-phase IF modulation signal to generate an real out-of-phase baseband signal, wherein the ratio of the amplitudes of the real in-phase baseband signal and the real out-of-phase baseband signal includes information about the range of the targets.

22. The radar system according to claim 21, further comprising:

a) an antenna, the antenna receiving electromagnetic waves and converting them to the receive signal and receiving a transmit signal and converting the transmit signal to electromagnetic; and b) a circulator coupled to the antenna, the BPSK modulator and the RF downconverter, the circulator passing receive signals from the antenna to he RF downconverter and passing transmit signals from the BPSK modulator to the antenna.

23. The radar system according to claim 21, wherein the BPSK IF frequency generator modulates the IF modulation signal with a pseudo random sequence.

24. The radar system according to claim 23, wherein the BPSK IF frequency generator modulates the in-phase IF modulation signal and the out-of-phase modulation signal with the pseudo random sequence.

25. The radar system according to claim 24, wherein the pseudo random sequence is one of 32 bits, 28 bits, 24 bits, 20 bits, 16 bits, 12 bits and 8 bits in length.

26. The radar system according to claim 25, wherein the pseudo random sequence is equal to one of 0000 0011 0111 1001 1110 1010 1001 0011, 0000 0101 1011 1010 1111 0010 0011, 0000 0110 0010 1011 1101 1011, 0000 0100 1110 1101 0111, 0000 1001 0111 0111, 0000 1011 1011, 0001 0111 and any combination of inversion, bit-reversal, and rotation thereof.

27. The radar system according to claim 21, wherein the BPSK IF frequency generator includes:
a) an oscillator, the oscillator generating a predetermined clock rate; and
b) a plurality of counters coupled to the oscillator, the plurality of counters generating at least two different signals each signal have a different clock rate.

28. The radar system according to claim 27, wherein the clock rate of one of the at least two different signals corresponds to a clock rate of the IF modulation signal and the clock rate of the other of the at least two different signals corresponds to a clock rate of the in-phase IF modulation signal and the out-of-phase IF modulation signal.

29. The radar system according to claim 28, wherein the IF modulation signal has a clock rate of 1.25 MHz, the in-phase IF modulation signal and the out-of-phase IF modulation signal have a clock rate 83.33 KHz.

30. The radar system according to claim 29, wherein the WBPSK IF frequency generator further includes:
a) a pseudo random number generator coupled to the plurality of counters, the pseudo random number generator generating a predetermined sequence of numbers; and
b) a delay circuit coupled to the pseudo random number generator, the delay circuit adding a fixed delay to the predetermined sequence of numbers.

31. A radar system for determining the range of targets, the system comprising:
(a) an RF signal generator, the generator generating an RF signal;
(b) a PN-coded BPSK IF frequency generator, the PN-coded BPSK IF frequency generator generating an PN-coded BPSK IF modulation signal, an in-phase PN-coded IF modulation signal, and an out-of-phase PN-coded IF modulation signal;
(c) a BPSK modulator coupled to the RF signal generator and PN-coded BPSK IF frequency generator, the BPSK modulator mixing the RF signal and the PN-coded BPSK IF modulation signal to generate a transmit signal;
(d) an RF downconverter coupled to the RF signal generator, the RF downconverter mixing a received signal and the RF signal to generate an intermediate PN-coded BPSK IF signal; and (e) a dual BPSK demodulator coupled RF downconverter and the PN-coded BPSK IF frequency generator, the dual BPSK demodulator mixing the intermediate PN-coded BPSK IF signal with the in-phase PN-coded modulation signal to generate an in-phase baseband signal and mixing the intermediate PN-coded BPSK IF signal with the out-of-phase PN-coded modulation signal to generate an out-of-phase baseband signal,
wherein the ratio of the amplitudes of the in-phase baseband signal and the out-of-phase baseband signal includes information about the range of the targets.

32. The radar system according to claim 31, further comprising:
a) a transmit antenna coupled the BPSK modulator, the transmit antenna converting the transmit signal to an electromagnetic wave; and
b) a receive antenna coupled to the RF downconverter, the receive antenna receiving an electromagnetic wave and converting the received electromagnetic wave into the receive signal.

33. The radar system according to claim 32, further comprising a dual low pass filter coupled to the dual BPSK demodulator, the dual low pass filter anti-alias filtering the in-phase baseband signal and the out-of-phase baseband signal.

34. The radar system according to claim 33, wherein the PN-coded BPSK IF frequency generator modulates the PN-coded BPSK IF modulation signal with a pseudo random sequence.

35. The radar system according to claim 34, wherein the PN-coded BPSK IF frequency generator modulates the in-phase IF modulation signal and the out-of-phase IF modulation signal with the pseudo random sequence.

36. The radar system according to claim 35, wherein the pseudo random sequence is one of 32 bits, 28 bits, 24 bits, 20 bits, 16 bits, 12 bits and 8 bits in length.

37. The radar system according to claim 36, wherein the pseudo random sequence is equal to one of 0000 0011 0111 1001 1110 1010 1001 0011, 0000 0101 1011 1010 1111 0010 0011, 0000 0110 0010 1011 1101 1011, 0000 0100 1110 1101 0111, 0000 1001 0111 0111, 0000 1011 1011, 0001 0111 and any combination of inversion, bit-reversal, and rotation thereof.

38. The radar system according to claim 31, wherein the PN-coded BPSK IF frequency generator includes:
a) an oscillator, the oscillator generating a predetermined clock rate; and
b) a plurality of counters coupled to the oscillator, the plurality of counters generating at least two different signals each signal have a different clock rate.

39. The radar system according to claim 38, wherein the clock rate of one of the at least two different signals corresponds to a clock rate of the PN-coded BPSK IF modulation signal, and the clock rate of the other of the at least two different signals corresponds to a clock rate of the in-phase PN-coded IF modulation signal and the out-of-phase PN-coded IF modulation signal.

40. The radar system according to claim 39, wherein the PN-coded BPSK IF frequency generator further includes:
a) a pseudo random number generator coupled to the plurality of counters, the pseudo random number generator generating a predetermined sequence of numbers; and
b) a delay circuit coupled to the pseudo random number generator, the delay circuit adding a fixed delay to the predetermined sequence of numbers.

41. The radar system according to claim 40, the system further comprising a dual analog to digital (A/D) converter coupled the dual low pass filter, the dual A/D converter converting the in-phase baseband signal from an analog signal to a digital signal and converting the out-of-phase baseband signal from an analog signal to a digital signal.

42. The radar system according to claim 41, the system further comprising a digital signal processor ("DSP") coupled to the dual A/D converter, the DSP processing the digital in-phase baseband signal and the digital out-of-phase baseband signal to interpret range information about the targets.

43. The radar system according to claim 1, further comprising:
   a) a delay circuit coupled to the RF signal generator, the delay circuit delaying the RF signal;
   b) a second RF downconverter coupled to the delay circuit, the second RF downconverter mixing the received signal and the delayed RF signal to generate a second intermediate IF signal;
   c) a second in-phase IF demodulator coupled to the second RF downconverter and the IF frequency generator, the second in-phase IF demodulator mixing the second intermediate IF signal and the in-phase IF modulation signal to generate an imaginary in-phase baseband signal; and
   d) a second out-of-phase IF demodulator coupled to the second RF downconverter and the IF frequency generator, the second out-of-phase IF demodulator mixing the second intermediate IF signal and the out-of-phase IF modulation signal to generate an imaginary out-of-phase baseband signal.

44. The radar system according to claim 43, wherein the delay circuit is a phase shifter and the phase shifter shifts the phase of the RF signal by 90 degrees.

45. The radar system according to claim 43, further comprising a transmit antenna coupled to the IF modulator, the transmit antenna converting the transmit signal to an electromagnetic wave.

46. The radar system according to claim 45, further comprising a receive antenna coupled to the RF downconverter and the delay circuit, the receive antenna receiving electromagnetic waves and converting them to the receive signal.

47. The radar system according to claim 43, wherein the IF frequency generator modulates the IF modulation signal with a pseudo random sequence.

48. The radar system according to claim 47, wherein the IF frequency generator modulates the in-phase IF modulation signal and the IF out-of-phase modulation signal with the pseudo random sequence.

49. The radar system according to claim 4, wherein the pseudo random sequence is 20 bits.

50. The radar system according to claim 49, wherein the pseudo random sequence is equal to one of 0000 0100 1110 1101 0111 and any combination of inversion, bit-reversal, and rotation thereof.

51. The radar system according to claim 4, wherein the pseudo random sequence is 28 bits.

52. The radar system according to claim 51, wherein the pseudo random sequence is equal to one of 0000 0101 1011 1010 1111 0010 0011 and any combination of inversion, bit-reversal, and rotation thereof.

53. The radar system according to claim 18, wherein the IF frequency generator further generates a demodulation signal having a clock rate of 1.333 MHz where the demodulation signal is mixed with the 1.25 MHz intermediate IF signal to generate the in-phase IF modulation signal and out-of-phase IF modulation signal having a clock rate of 83.33 KHz.

54. The radar system according to claim 29, wherein the IF frequency generator further generates a demodulation signal having a clock rate of 1.333 MHz where the demodulation signal is mixed with the 1.25 MHz intermediate IF signal to generate the in-phase IF modulation signal and out-of-phase IF modulation signal having a clock rate of 83.33 KHz.

55. The radar system according to claim 48, wherein the pseudo random sequence is one of 32 bits, 28 bits, 24 bits, 20 bits, 16 bits, 12 bits and 8 bits in length.

56. The radar system according to claim 55, wherein the pseudo random sequence is equal to one of 0000 0011 0111 1001 1110 1010 1001 0011, 0000 0101 1011 1010 1111 0010 0011, 0000 0110 0010 1011 1101 1011, 0000 0100 1110 1101 0111, 0000 1001 0111 0111, 0000 1011 1011, 0001 0111 and any combination of inversion, bit-reversal, and rotation thereof.

* * * * *

UNITED STATES PATENT AND TRADEMARK OFFICE
CERTIFICATE OF CORRECTION

PATENT NO. : 6,236,352 B1  
DATED : May 22, 2001  
INVENTOR(S) : Prescott A. Walmsley Page 1 of 1

It is certified that error appears in the above-identified patent and that said Letters Patent is hereby corrected as shown below:

Column 17,  
Line 18, "out-of1-phase" should read -- out-of-phase --.

Column 19,  
Line 41, "WBPSK" should read -- BPSK --.

Signed and Sealed this

Eighteenth Day of December, 2001

Attest:

Attesting Officer

JAMES E. ROGAN  
Director of the United States Patent and Trademark Office